(12) United States Patent
Montalbano

(10) Patent No.: US 8,005,159 B2
(45) Date of Patent: Aug. 23, 2011

(54) METHODS FOR CHANNEL ESTIMATION IN THE PRESENCE OF TRANSMIT BEAMFORMING

(75) Inventor: Giuseppe Montalbano, Biot (FR)

(73) Assignee: ST-Ericsson SA, Geneva (CH)

( * ) Notice: Subject to any disclaimer, the term of this patent is extended or adjusted under 35 U.S.C. 154(b) by 1497 days.

(21) Appl. No.: 10/532,912

(22) PCT Filed: Oct. 10, 2003

(86) PCT No.: PCT/IB03/04510
§ 371 (c)(1),
(2), (4) Date: Apr. 27, 2005

(87) PCT Pub. No.: WO2004/040869
PCT Pub. Date: May 13, 2004

(65) Prior Publication Data
US 2006/0023653 A1    Feb. 2, 2006

(30) Foreign Application Priority Data

Oct. 30, 2002  (EP) .................................... 02292709
Feb. 5, 2003   (EP) .................................... 03290294

(51) Int. Cl.
*H04B 7/02* (2006.01)
(52) U.S. Cl. ........ 375/267; 375/136; 375/142; 375/144; 375/150; 375/152; 375/262; 375/341
(58) Field of Classification Search .................. 375/267, 375/136, 142, 144, 150, 152, 262, 341
See application file for complete search history.

(56) References Cited

U.S. PATENT DOCUMENTS

| 5,533,067 A  * | 7/1996 | Jamal et al. ................... 375/341 |
| 6,385,185 B1 * | 5/2002 | Huang .......................... 370/342 |
| 7,346,121 B2 * | 3/2008 | Dabak et al. .................. 375/295 |
| 2003/0099216 A1 * | 5/2003 | Nilsson et al. ................ 370/335 |

FOREIGN PATENT DOCUMENTS

| EP | 1191755 A2 | 3/2002 |
| EP | 1191755 A3 | 3/2005 |

OTHER PUBLICATIONS

J. Ylitalo; Channel Estimation Study of CDMA Downlink for Fixed Beam BTS; CAT No. 02TH8637; vol. 1 pp. 242-246; 2002, NJ, USA.
Nokia; Proposal for User-Specific Beamforming for UTRA FDD, R4-010528 TSG RAN WG4, Meeting #17; May 2001, Sweden.
Ericsson; Dedicated Pilots, R4-010594; TSG RAN WG4 Meeting #17, May 2001, pp. 21-25, Sweeden.

(Continued)

*Primary Examiner* — Kabir A Timory
(74) *Attorney, Agent, or Firm* — William J. Kubida; Peter J. Meza; Hogan Lovells US LLP

(57) ABSTRACT

The present invention relates to a method for estimating a propagation channel in the presence of transmit beam-forming within a receiver, accounting for the structure of two logical channels referred as to a common channel and a dedicated physical channel (CPICH, DPCH) and based on a common structure of corresponding propagation channels, said DPCH channel comprising two sub-channels (DPDCH, DPCCH), said propagation channels being modeled as a linear superposition of a finite number of discrete multipath components following an uncorrelated-scattering wide-sense stationary model, a multipath component being characterized by a time-varying multipath complex coefficient and a delay. Use: RAKE Receiver.

17 Claims, 4 Drawing Sheets

METHODS FOR CHANNEL ESTIMATION IN THE PRESENCE OF TRANSMIT BEAMFORMING

FIELD OF THE INVENTION

The present invention relates to a method for estimating a propagation channel in the presence of transmit beamforming. It further relates to an estimator implementing said method.

Said method is suited to be used in particular within the UMTS standard and especially within a conventional RAKE receiver.

BACKGROUND OF THE INVENTION

A UMTS communication system, defined in the UTMTS standard (see the "3GPP Technical Specifications, Rel. 99"), at the 3GPP website under specifications, incorporated herein by reference, comprises at least a base station (BS) and a mobile phone terminal, referred to as user equipment (UE) throughout the document. Both the BS and the UE includes a transmitter and a receiver. The BS sends signals by means of the BS transmitter to the UE receiver in the downlink. The UE sends signals by means of the UE transmitter to the BS receiver in the uplink. In uplink and downlink communication both the UE and BS map the data to be transmitted into logical channels.

In particular the UMTS standard provides two logical channels for the downlink communication, a first channel denoted common pilot channel (CPICH) consisting of a continuous sequence of known pilot symbols and a second logical channel denoted dedicated physical channel (DPCH). Said second logical channel DPCH consists of a first logical sub-channel denoted dedicated physical data channel (DPDCH), that carries the information data symbols intended for the user concerned, time multiplexed with a second logical sub-channel denoted dedicatedphysical control channel (DPCCH), that carries known user-dedicated pilot symbols.

Transmit beamforming can be employed at the BS during downlink communication to improve the reception at the UE of the user information data mapped into the logical channel DPDCH. To perform transmit beamforming, the BS needs to be equipped with multiple antennas. In this way it is possible to provide optimal spatial filtering by shaping beams in the directions of the user concerned while setting nulls in other users directions to mitigate the interference to other users. Hence the use of transmit beamforming can significantly improve the efficiency in the use of the spectrum, allowing a larger number of users to share the same spectrum, thanks to an improved user-dedicated data reception and reduced interference. While transmit beamforming is to be employed for the transmission of the logical channel DPCH, it is not suited for the logical channel CPICH transmission that is to be uniformly broadcast in time and space (i.e. in all directions) to all users. As seen from the UE receiver, the transmission of the logical channel DPCH occurs through a so called DPCH propagation channel consisting of the cascade of the BS transmitter chain, including the beamforming antenna system, the actual propagation channel from the BS to the UE and the UE receiver chain. Unlike the logical channel CPICH, downlink transmission occurs through a so-called CPICH propagation channel consisting of the cascade of the BS transmitter chain, including an omnidirectional antenna system in place of the beamforming antenna system, of the actual propagation channel from the BS to the UE and the receiver chain. For the sake of brevity we shall refer to a DPCH channel and a CPICH channel and the above DPCH propagation channel and CPICH propagation channel respectively throughout the present document. The UE receiver needs to estimate the DPCH channel in order to demodulate, decode, and recover the information data contained in the DPDCH. In the absence of transmit beamforming the CPICH channel and the DPCH channel are the same (up to an uninfluential real scalar factor due to the different transmit power allocated to the DPDCH, DPCCH and CPICH logical channels). The continuous provision of known pilot symbols of the CPICH logical channel can be easily used at the UE receiver to estimate the CPICH channel, which is the same as the DPCH channel, and then use this estimate for DPDCH information data recovery. Unfortunately, when transmit beamforming is applied, the known pilots of the CPICH logical channel yet provide estimates for the CPICH channel, but those estimates cannot be directly applied as channel estimates for the DPCH channel that is different from the CPICH channel. Then the UE receiver has to rely on different techniques to estimate the DPDCH channel in order to recover the information data.

SUMMARY OF THE INVENTION

Accordingly, it is an object of the invention to provide a method for DPDCH channel estimation in the presence of transmit beamforming optimally exploiting all information available from the logical channels DPCH and CPICH, while limiting computational complexity, and an associated estimator implementing said method.

To this end, according to a first object of the invention, there is provided a method for estimating a propagation channel in the presence of transmit beamforming, and an estimator for estimating a propagation channel in the presence of transmit beamforming.

As we will see in detail further on, this method enables the UE receiver to cope with transmit beamforming applied to DPCH transmission by jointly exploiting the CPICH and DPCH logical channels information available at the UE. The first embodiment of the method optimally exploits this information according to the maximum-a-posteriori criterion, which is well known to the person skilled in the art, to estimate the DPDCH propagation channel multipath coefficients as described above. We shall show that in the presence of transmit beamforming, each multipath component coefficient of the DPCH channel differs from the corresponding multipath component coefficient of the CPICH channel by an unknown complex scale factor already referred to as beamforming complex factor. The second embodiment of the method provides an estimate of that beamforming complex factor. Then an estimate of the multipath component coefficient of the DPCH propagation channel is built by multiplying each multipath component coefficient estimate of the CPICH channel by the related complex scale factor estimate. In this way a considerable computation saving is possible with respect to the first method. Moreover, the use of the CPICH channel estimates also allows to continuously track the channel variations with time due to the Doppler spread generated by the motion of the UE, thanks to the continuous provision of known pilot symbols of said CPICH logical channel.

BRIEF DESCRIPTION OF THE DRAWINGS

The invention and additional features, which may be optionally used to implement the invention to advantage, are apparent from and elucidated with reference to the drawings described hereinafter.

DETAILED DESCRIPTION OF THE EMBODIMENTS

1. Introduction

Figure 1:
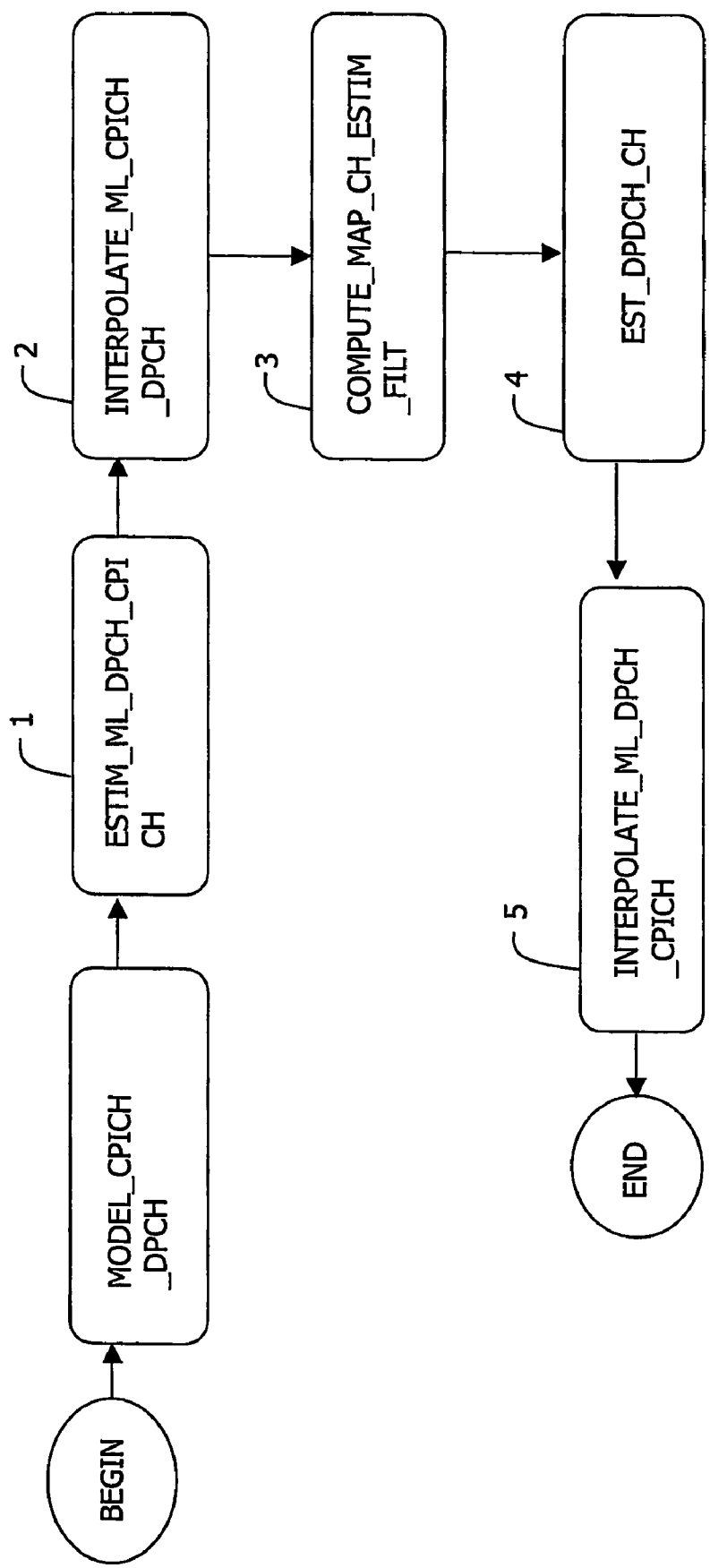
FIG. 1 represents a diagram illustrating the main steps of said first method for DPDCH channel estimation according to the invention.
Figure 2:
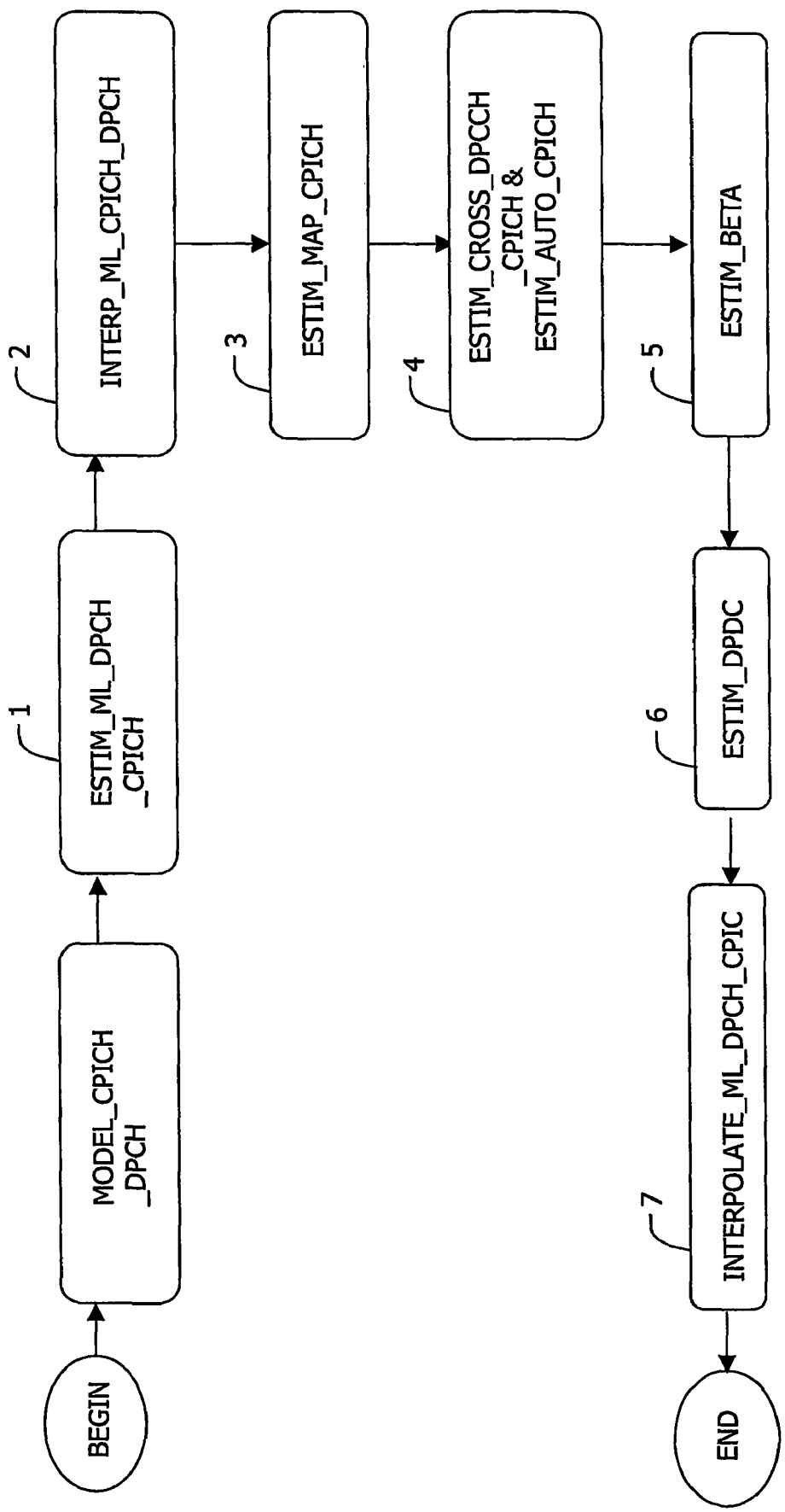
FIG. 2 represents a diagram illustrating the main steps of said second method for DPDCH channel estimation according to the invention.

In the following description, functions or constructions well-known to a person of ordinary skill in the art are not described in detail since they would unnecessarily obscure the invention.

The present invention relates to a method and embodiments for the estimation of the propagation channel in a communication system when information data are transmitted through a beamforming system. Said methods are particularly suitable for implementation in a RAKE receiver within the LTMTS standard when information data are transmitted from a base station BS to user equipment UE, here a mobile phone.

The UMTS standard provides two logical channels for the downlink communication: a first channel denoted common pilot channel (CPICH) consisting of a continuous sequence of known pilot symbols and a second logical channel denoted dedicatedphysical channel (DPCH). Said second logical channel DPCH consists of a first logical sub-channel denoted dedicated physical data channel (DPDCH) that carries the information data intended for the user concerned, time-multiplexed with a second logical sub-channel denoted dedicated physical control channel (DPCCH) that carries known user-dedicated pilot symbols. Every time slot a DPCH is allocated, namely a DPDCH data field followed by DPCCH pilot field is allocated.

Transmit beamforming can be employed at the base station during downlink communication to improve the reception at the UE of the user information data mapped in the logical channel DPDCH. To perform transmit beamforming the BS needs to be equipped with multiple antennas. In this way it is possible to provide optimal spatial filtering by shaping beams in the directions of the user concerned while setting nulls in other users directions to mitigate the interference to other users. Hence the use of transmit beamfonming can significantly improve the efficiency in the use of the spectrum, allowing a larger number of users to share the same spectrum, thanks to improved user-dedicated data reception and reduced interference. Whereas transmit beamforming is to be employed for the transmission of the logical channel DPCH, it is not suited for the logical channel CPICH transmission that is to be uniformly broadcast in time and space (i.e. in all directions) to all users. As seen from the UE receiver, the transmission of the logical channel DPCH occurs through a so-called DPCH channel consisting of the cascade of the BS transmitter chain, including the beamforming antenna system, the actual propagation channel from the BS to the UE and the UE receiver chain. In contrast, the logical channel CPICH is transmitted through a so-called CPICH channel consisting of the cascade of the BS transmitter chain, including an omnidirectional antenna system in lieu of the beamforming antenna system, of the actual propagation channel from the BS to the UE and the receiver chain. The UE receiver needs to estimate the DPCH charnel in order to demodulate, decode, and recover the information data contained in the DPDCH. In the absence of transmit beamforming the CPICH channel and the DPCH channel are the same (up to a real scalar factor due to the different transmit power allocated to the DPDCH, DPCCH and CPICH logical channels). The continuous provision of known pilot symbols of the CPICH logical channel can easily be used at the UE receiver to estimate the CPICH channel, that is the same as the DPCH channel, and then use this estimate for DPDCH information data recovery. Unfortunately, when transmit beamforming is applied, the known pilots of the CPICH logical channel yet provide estimates for the CPICH channel, but these estimates cannot be directly applied as channel estimates for the DPCH channel because this is different from the CPICH channel.

2. Fundamentals on Data Transmission and Reception in DS-CDMA

In order for the information dedicated to a certain user to be transmitted? the source information data are properly mapped into a binary alphabet, i.e. into bits, via source-encoding techniques. Then these bits are channel-encoded by using suitable channel codes in order to protect the information bits from all impairment causes (noise, interference) during the transmission. The channel-coded bits are then modulated by mapping bits into symbols according to a certain modulation scheme (e.g. QPSK modulation, well know by the person skilled in the art) where each symbol is represented by one or more bits (in QPSK modulation each symbol is represented by two bits). In DS-CDMA systems said symbols are then spread over a larger bandwidth by filtering with specific spreading sequences. In the literature spread symbols are referred to as chips. Notice that the duration of a chip period is shorter than the duration of a symbol period by a factor approximately equal to the bandwidth expansion factor of the spreading operation. Said factor is equal to the number of chips per symbol period and is referred to as spreadingfactor. Symbol sequences carrying information bits from different sources are spread with different spreading sequences in order for several users to share the same bandwidth and for the receivers to be able to discriminate and recover the desired user's symbol sequences based on the knowledge of the user specific spreading sequence. The obtained chips are then filtered by a pulse-shape filter (a root-raised cosine filter in the case of UMTS) and digital-to-analog (D/A) converted. The resulting analog signal is then modulated to radio frequency and transmitted by the BS antenna(s). Similarly, when transmit beamforming is employed the same sequence of chips filtered by the pulse-shape filter is sent to all the antennas after multiplication by an antenna-specific complex weight factor. The antenna-specific weight factors can be collected in a so-called beamforming weight vector. The choice of said beamforming weight vector determines the shape of the irradiation diagram, in terms of magnitude and phase, of the multiple-antenna system of the BS. The signals transmitted from the antennas undergo several scattering, diffraction, and reflection phenomena through the actual propagation channel from the BS antennas to the UR receiver antenna. Noise and interference from other users and neighboring BS further contribute to impairing the useful signal(s) for the UE concerned. The radio frequency signal received at the UE antenna is demodulated down to baseband (or intermediate frequency IF) and analog-to-digital (A/D) converted to generate a digital baseband signal. Then the UE receiver processes this baseband signal in order to recover the useful information data intended for the user concerned. For this purpose, the receiver needs to estimate the cascade of the transmitter chain, the actual wireless propagation channel and receiver chain up to the A/D conversion, associated with the transmission of the useful data. In the literature this cascade is in general simply referred to as the channel. In that which follows, a detailed mathematical description of the above operations is provided.

3. Signal and Channel Model

General DS-CDMA signal and channel models are provided. Such models will then be applied to the specific cases of UMTS CPICH and DPCH signals and channels.

3.1. General Signal Model

We consider a general case of transmission of a signal s(t) through a multipath channel with impulse response h(t,τ). The continuous-time complex baseband received signal prior to A/D conversion at the receiver is modeled as:

$$y(t) = x(t) + v(t) \quad (1)$$

where x(t) represents the part of the received signal that comprises the useful data and v(t) denotes the noise plus interference term. The signal x(t) is given by:

$$x(t) = \int h(t, t-\tau) z(\tau) d\tau \quad (2)$$

where h(t,τ) represents a time-varying channel impulse response and $$z(t) = \sum_k a(k) \psi(t - kT_c) \quad (3)$$

represents the transmitted signal after D/A conversion at the transmitter, with $T_c$ denoting the chip period and $a(k) = s(\lfloor k/M \rfloor) d(k)$, where M denotes the spreading factor, and $\lfloor \cdot \rfloor$ denotes the flooring operator. Moreover, s(n) represents the n-th modulation symbol (e.g., QPSK), d(k) denotes the k-th chip of the spreading sequence, and ψ(t) represents the pulse-shaping filter that limits the system bandwidth. Note that this model can be used by systems with several spreading layers, like DS-CDMA system defined by the standard UMTS, IMT-2000 and IS-95 (see the "IMT-2000 website").

The channel h(t,τ) is assumed to follow the wide-sense stationary uncorrelated scattering model with Rayleigh fading and multipath response as described in "J. G. Proakis *Digital Communications*, NY: McGraw-Hill, $3^{rd}$ edition, 1995".

$$h(t, \tau) = \sum_{p=1}^{P} c_p(t) \delta(\tau - \tau_p) \quad (4)$$

where P denotes the number of multipath components, and $c_p(t)$ and $\tau_p$ denotes the time-varying complex coefficient and the propagation delay associated with p-th multipath component. The path complex coefficients $c_p(t)$ vary depending on the velocity of the UE and of the surrounding scattering objects (e.g., buildings, hills but also other moving objects) with respect to the BS. When the BS uses Q antennas for transmit beamforming, the channel model expressed by (4) generalizes to $$h(t, \tau) = \sum_{p=1}^{P} w^H a(\theta_p) c_p(t) \delta(\tau - \tau_p) \quad (5)$$

where
- $w = [w_0, \ldots, w_{Q-1}]^T$ denotes the transmit beamforming weight vector
- $a(\theta) = [\alpha_0(\theta), \ldots, \alpha_{Q-1}(\theta)]^T$ denotes the antenna response vector in a direction θ. The superscripts $(\cdot)^T$ and $(\cdot)^H$ denote transpose and Hermitian transpose respectively. Since in a practical implementation the vector w typically may vary at most at the slot rate for the sake of notation, its variations with time are not explicitly taken into account in equation (5).

By inspecting equations (4) and (5) one may notice that, during a time slot, transmit beamforming only affects the amplitude of the path time-varying complex coefficients $c_p(t)$ by a complex factor $w^H a(\theta_p)$ and not the delays $\tau_p$. In other words, the channel's temporal structure is not affected by the antenna response vector, neither by the transmit beamforming. Thus the path time-varying complex coefficients $\beta_p c_p(t) = w^H a(\theta_p) c_p(t)$ and $c_p(t)$ are the same in both case (4) and (5) up to a complex factor $\beta_p = w^H a(\theta_p)$ representing the previously mentioned beamforming complex factor. Therefore, a channel estimate according to (5) can be built from estimates of the delays $\tau_p$, of the coefficients $c_p(t)$ and of $\beta_p$ for p=1, . . . , P.

3.2. Received Signal Model for DPCH and CPICH

We now apply the previous general channel model to the DPCH and CPICH channels considering the case of UMTS where the CPICH and DPCH channels are superposed. Then the continuous-time complex baseband received signal (1) can be written as $$y(t) = x_{cpich}(t) + x_{dpch}(t) + v(t) \quad (6)$$

where $x_{cpich}(t)$ and $x_{dpch}(t)$ are the signal components associated with the CPICH and DPCH channels respectively, given by $$x_{cpich}(t) = \int h_{cpich}(t, t-\tau) z_{cpich}(\tau) d\tau$$

$$x_{dpch}(t) = \int h_{dpch}(t, t-\tau) z_{dpch}(\tau) d\tau$$

where $$h_{cpich}(t, \tau) = \sum_{p=1}^{P} c_p(t) \delta(\tau - \tau_p)$$

$$h_{dpch}(t, \tau) = \sum_{p=1}^{P} w^H a(\theta_p) c_p(t) \delta(\tau - \tau_p)$$

and $$z_{cpich}(t) = \sum_k a_{cpich}(k) \psi(t - kT_c)$$

$$z_{dpch}(t) = \sum_k a_{dpch}(k) \psi(t - kT_c)$$

where
- $\alpha_{cpich}(k) = s_{cpich}(\lfloor k/256 \rfloor) d_{cpich}(k)$,
- $\alpha_{dpch}(k) = s_{dpch}(\lfloor k/M \rfloor) d_{dpch}(k)$,
- $s_{cpich}(n)$, $s_{dpch}(i)$ denote the n-th modulation symbol associated with the CPICH and the i-th modulation symnbol associated with the DPCH respectively, and $d_{pich}(k)$, $d_{dpch}(k)$ donote the k-th chips of the CPICH and DPCH spreading sequences respectively.

3.3. Remarks

It will be noted that the spreading factor M may not be the same for the CPICH and DPCH logical channels. In the UMTS standard the CPICH has a fixed spreading factor equal to 256, whereas the DPCH has a spreading factor that can take on values in the set {4, 16, 32, 64, 128, 256, 512}.

Furthermore, the CPICH symbols are all the same, i.e., $s_{cpich}(n) = A(1+j)$ for any n, where A is a real amplitude factor taking into account the power that the BS assigns to the CPICH logical channel. The a-priori knowledge at the UE receiver of the symnbols comprising the CPICH can be exploited to estimate the channel $h_{cipch}$ as expressed by (4). In the absence of transmit beamforming on the DPCH $h_{cpich} = h_{dpch}$, so that such an estimate based on the CPICH symbols would suffice for the receiver to recover the desired user's information symbols on the DPCH. On the contrary, if transmit beamforming is applied to the DPCH, the a-priori knowledge of the CPICH symbols yet allows to easily estimate the channel $h_{cpich}$ as expressed by (4), but not the channel $h_{dpch}$ associated with the DPCH expressed by (5) which differs from the $h_{cpich}$ due to the presence of the unknown coefficients $\beta_p$. Hence other approaches need to be addressed to provide an estimate of the channel $h_{dpch}$ necessary to recover the information symbols transmitted over the DPDCH.

We have implicitly assumed above a digital baseband receiver where baseband signals are processed after A/D conversion. In other words the signal expressed by (6) is A/D converted, prior to all baseband processing. In particular we consider the UE receiver to be a discrete-time RAKE receiver (see J. G. Proakis Digital Communications, NY: McGraw Hill, $3^{rd}$ edition, 1995 incorporated herein by reference). We shall notice that the methods hereby addressed can be applied to all types of baseband receivers relying on channel estimation though.

4. Channel Estimation

Since the delays $\tau_p$ are not affected by the presence of transmit beamforming, we shall assume that they are already recovered by usual delay estimation/tracking techniques (e.g. delay lock loop, see J. G. Proakis Digital Communications, NY: McGraw-Hill, $3^{rd}$ edition, 1995 incorporated herein by reference and exploiting the knowledge of the CPICH symbols) and we shall focus on the estimation of the channel path coefficients $c_p(t)$ and $\beta_p$. In order for those coefficients to be estimated we consider the signals at each finger of the RAKE receiver after despreading of both the CPICH and the DPCH.

For the sake of simplicity we shall limit the treatment to the single path/finger case, the multi-finger case being a straightforward generalization of it. Thus, we will drop the subscript p to denote the time-varying complex coefficient $c_p(t)$ hereinafter also referred to as path fading coefficient, or simply path coefficient. Moreover, for the sake of brevity in the following we shall refer to "channel estimation" and "channel estimate" as the channel path coefficient estimation and estimate respectively.

Furthermore, in a first instance, we also limit the analysis to the case where the DPCH spreading factor M is equal to that of the CPICH. We shall generalize the analysis to other spreading factors successively.

In addition, we need to model the previously mentioned interference and noise term. In particular the multi-access interference arises from the interference among different users and the interferences due to the CPICH over the DPCH and/or due to different data flows dedicated to the same user, and the inter-path interference is due to the interference between the impulse responses associated with paths at different delays $\tau$.

Assuming that the whole interference and noise to be modeled as a zero-mean complex circularly symmetric additive white Gaussian noise (AWGN), the CPICH and DPCH despread signals at a RAKE finger are respectively given by:

$$y_{cipch}(n)=c(n)s_{cipch}(n)+v_{cipch}(n) \quad (7)$$

$$y_{dpch}(n)=w^H a(\theta)c(n)s_{dpch}(n)+v_{dpch}(n)$$

where $v_{dpch}(n)$ and $v_{cpich}(n)$ denote the noise-plus interference terms associated with the DPCH and CPICH respectively, assumed to be independent, c(n) is the discrete-time representation at symbol rate of the path time-varying complex coefficient previously denoted c(t) or $c_p(t)$, $s_{dpch}(n)$ and $s_{cpich}(n)$ denote the symbols of the DPCH and CPICH logical channels respectively, at a symbol time n. Under the assumption that the CPICH and DPCH channels may vary every symbol time n, and that the interference and the noise can be modeled as a zero mean AWGN, we then build a maximum likelihood (ML) static instantaneous channel estimate at every symbol time n as follows:

$$\hat{c}_{cipch}(n)=s^*_{cipch}(n)y_{cipch}(n)=c(n)+v_{cipch}(n)$$

$$\hat{c}_{dpch}(n)=s^*_{dpch}(n)y_{dpch}(n)=w^H a(\theta)c(n)+v_{dpch}(n) \quad (8)$$

where, s*(n) denotes the complex conjugated of s(n), $v_{cpich}(n)$ and $v_{dpch}(n)$ represent the AWGN associated with the CPICH and DPCH channels respectively, and where, without loss of generality, we assumed the symbols of both channels to be normalized such that $|s_{dpch}(n)|=|s_{cpich}(n)|=1$. In order for the estimates (8) to be computed one needs to know the transmitted symbols $S^*_{dpch}(n)$ and $S^*_{cpich}(n)$. The symbols $S^*_{cpich}(n)$ are all known at the receiver. Within the DPCH only the dedicated pilot symbols $S^*_{dpcch}(n)$ comprising the DPCCH are known, but not the data symbols comprising the DPDCH. Therefore, if DPDCH symbols $S^*_{dpdch}(n)$ are to be used in (8) they first need to be estimated by, e.g., a decision-direct technique. The ML estimates (8) are therefore formed from the observations $y_{cipch}$ and $y_{dpch}$ at the output of a finger in a data aided (DA) fashion when there are a priori known pilot symbols, as for the cases of CPICH and DPCCH, and in a decision direct (DD) fashion in the presence of unknown data symbols as for the DPDCH. The DD approach requires the use of hard decisions taken on the DPDCH at the RAKE receiver output as pilot symbols. Therefore, from (8) we have $$\hat{c}_{dpcch}(n)=s^*_{dpcch}(n)y_{dpcch}(n)=w^H a(\theta)c(n)+v_{dpcch}(n) \quad (9)$$

for the DPCCH case (DA) and $$\hat{c}_{dpdch}(n)=\hat{s}^*_{dpdch}(n)y_{dpdch}(n)=w^H a(\theta)c(n)+v_{dpdch}(n) \quad (10)$$

for the DPDCH case (DD) where $\hat{s}_{dpdch}(n)$ represents the estimate of the n-th DPDCH symbol built as a hard decision taken at the RAKE receiver output. Equations (8)-(10) represent the basis for the derivation of the DPDCH channel estimation algorithms addressed in the following. In order to support the next derivation, further details are provided concerning the physical behavior and related models for the CPICH and DPCH channels.

4.1. Physical Interpretation of CPICH and DPCH Fading Channel Models

Due to the large bandwidth of the UMTS W-CDMA system the channel from the BS to a UE can be modeled as comprising a set of discrete multipath components. In particular it is possible to approximate the channel impulse response as a linear superposition of a finite number of independent multipath components as expressed by equations (4) and (5). In what precedes we have also referred to a multipath component simply as a channel path. A path is characterized by a delay and a complex coefficient. When the UE (and/or any other scattering object) is in motion with respect to the BS, each path complex coefficient may vary with time. Thus the overall channel impulse response varies with time as well, as expressed by equation (4) and following. This phenomenon is typically referred to as Doppler spread, from the Doppler effect arising when in a communication either the transmitter or the receiver moves one with respect to another. The channel Doppler spread represents the rate at which the channel impulse response varies, or focusing on a channel path, the rate at which the path complex coefficient varies with time. The Doppler spread increases with the velocity of the UE with respect to the BS. From a physical standpoint to each path of the CPICH channel corresponds a path on the DPCH channel with the same delay $\tau$ and the same Doppler spread but with different complex-path amplitudes, namely c(n) and $\beta c(n)$ respectively, according to equations (4) and (5). Then as long as the factors is constant, both CPICH and DPCH channel paths vary at the rate of c(n), namely they share the same Doppler spread. Hence the two complex paths' amplitudes temporal variations are the same while they always differ only by the beamforming complex factor β that is determined by the scalar product of the beamforming weight vector w and the antenna array response a(θ) corresponding to the direction θ of that path.

4.2. Optimal Joint MAP CPICH-DPCH Based DPDCH Channel Estimation

The optimal joint CPICH-DPCH MAP DPDCH channel estimation problem is formulated as a direct extension of the simpler CPICH MAP channel estimation problem addressed in "J. Baltersee, G. Fock, P. Schultz-Rittich, and H. Meyr, "Performance analysis of phasor estimation algorithms for FDD-UMTS RAKE receiver," IEEE 6$^{th}$ Symp. on Spread Spectrum Technologies and Applications, NJIT, NJ, September 2000" incorporated herein by reference.

The general formulation of the MAP optimization criterion corresponds to the following optimization problem $$\hat{c}_{MAP}(k) = \arg\max_{c(k)} p(c(k) | y, s)$$

namely $\hat{c}_{MAP}(k)$ is the argument that maximizes the a posteriori probability density function p(c(k)|y, s) of c(k) given the vector y of the observations $y_{cpich}(n)$ and $y_{dpch}(n)$ expressed by (7) and the vector s of the pilot symbols $s_{cpich}(n)$ and $s_{dpch}(n)$.

We shall see that even though optimal MAP DPDCH channel estimation is generally too computationally demanding for a feasible implementation within a realistic UE, its derivation provides the proper guidelines for other reduced complexity estimator for the DPDCH channel yet according to certain optimality criteria.

Under the assumption that the channel paths are a Gaussian complex random process, the maximum a posteriori probability (MAP) DPDCH channel path coefficient estimate at time instant k is given by the conditional by expected value $\hat{c}_{MAP}(k)$ of $\hat{c}_{ML}(k)=\hat{c}_{dpdch}(k)$ given the observation column vector $\hat{c}_{ML}$ comprising all the available ML instantaneous channel path coefficient estimates $\hat{c}_{dpch}(m)$ with ≠k, and $\hat{c}_{cipch}(n)$ defined according to equations (8)-(10), i.e.:

$$\hat{c}_{MAP}(k) = E\{\hat{c}_{ML}(k) | \hat{c}_{ML}\} \quad (11)$$

Equation (11) can be simply explained by observing that the ML estimates $\hat{c}_{ML}(k)$ according to equations (8)-(10) are still Gaussian complex random variables with mean given by the true DPDCH channel $c_{dpdch}(k)=\beta c(k)$ and variance given by the variance of the noise term $v_{dpch}(k)$. In order to achieve a MAP estimate the α-posteriori probability density function of $\hat{c}_{ML}(k)$ (i.e., the probability density function of $\hat{c}_{ML}(k)$ conditioned to $\hat{c}_{ML}$) has to be maximized. It is well known that the maximum of a Gaussian probability density function is reached in corresponding to the mean value of the distribution. Henceforth taking the expectation equation (11) maximizes the conditional probability density function yielding a MAP channel estimate. It can be shown (see e.g. H. Meyr, M. Moeneclay, and S. Fetchel, "Digital Communication Receivers: Synchronization, channel estimation and signal processing", John Wiley & Sons, New York, 1998" incorporated herein by reference) that a MAP optimal channel estimate (11) can be built by low-pass filtering a set of instantaneous ML channel estimates (8) as follows:

$$\hat{c}_{MAP}(k) = f^H \hat{c}_{ML} \quad (12)$$

where $f=[f(N-1) \ldots f(0)]^T$ in (12) is the vector of the low pass filter coefficients, with $N=K_{cpich}+K_{dpch}$, $K_{dpch}$ and $K_{cpich}$ being the numbers of the available ML instantaneous channel estimates of the DPCH, $\hat{c}_{dpch}(m)$, and of the CPICH, $\hat{c}_{cpich}(n)$, respectively. Under the previous assumption that the channel paths are Rayleigh fading the optimal filter $f=[f(N-1) \ldots f(0)]^T$ yielding a MAP channel estimate is given by:

$$f = R_{\hat{c}\hat{c}}^{-1} r_{\hat{c}c^*} \quad (13)$$

where $R_{\hat{c}\hat{c}} = E\{\hat{c}_{ML} \hat{c}_{ML}^H\}$ represents the covariance matrix of the ML channel estimates, $r_{\hat{c}c} = E\{\hat{c}_{ML} c_{dpdch}^*(k)\}$ represents the vector of the cross-correlation between the ML channel estimates and the true DPDCH channel at time instant k.

The optimal filter f given by equation (13) corresponds to the well-known Wiener filter, also known as a linear prediction filter. Depending on whether the vector $\hat{c}_{ML}$ includes only past, or only future, or both past and future ML instantaneous channel estimates of the form (8)-(10) with respect to the DPDCH channel $c_{dpdch}(k)$, equation (13) gives rise to a forward, a backward, or a forward-backward linear prediction filter respectively.

The optimal linear prediction filter f can be easily computed also in the more general case of Rice fading channels as shown in great detail in H. Meyr, M. Moeneclay, and S. Fetchel, "Digital Communication Receivers: Synchronization, channel estimation and signal processing", John Wiley & Sons, New York, 1998" incorporated herein by reference. Despite the fact that theory clearly indicates a closed form expression for the optimal solution to the problem of MAP channel estimation, as demonstrated above, a practical implementation of such an optimal estimator poses several complexity issues which generally prevent its feasibility within a practical UE architecture. In the next section we shall address the implementation of a MAP channel estimator. To this end we shall rely on the concepts of Wiener filtering, linear prediction, as well as adaptive and LMS-Kalman filtering oriented to MAP channel estimation along with fading channel models, which are considered to be well-known by the person of ordinary skill in the art.

4.2.1. Implementation of the Optimal DPDCH MAP Channel Estimation

In order to implement the optimal joint CPICH-DPCH MAP DPDCH channel estimator in a practical UE the optimum Wiener FIR filter coefficients $f=[f(N-1) \ldots f(0)]^T$ are to be computed. For this computation to be possible the statistics of the observation $\hat{c}_{ML}$ and of the true channel $c_{dpdch}(k)$ are needed at the UE. These quantities can be estimated assuming structured channel and signal models, such as the Jakes' fading model (see: J. G. Proakis Digital Communications, NY: McGraw-Hill, 3$^{rd}$ edition, 1995 incorporated herein by reference), and AWGN model for the noise and interference terms. Then estimates of the model parameters are needed, i.e., the Doppler spread (or the UE velocity relative to the BS), the signal power and the interference-plus noise power spectral density. To save computations, the UE may select the optimal Wiener FIR filter from a set of pre-computed filter coefficients based upon the estimates of the parameters of the statistic channel model. Unfortunately, even neglecting the complexity involved by the parameter estimation, this approach is unfeasible. Indeed the number of filter coefficients to be stored would be overwhelming compared to the memory storage capabilities of a real UE. A sub-optimal solution would consist of using a reduced set of Wiener filters that can cope with the maximum envisaged channel Doppler spread (normalized with respect to the symbol duration). Different filters would be selected based only upon the signal-to-noise-plus interference ratio (SINR) estimate and no longer on the Doppler spread estimate. Indeed, estimating the Doppler spectrum is generally much harder than estimating the SINR. Moreover, SINk estimates are needed anyhow to perform closed loop power control. In order to guarantee that no information loss occurs at the maximum Doppler spread for a given spreading factor, these filters need to be designed to cope with the widest envisaged Doppler bandwidth. This solution yields significantly suboptimal performance at low Doppler spread (i.e. low UE velocities) and/or low spreading factors, because the filter bandwidth is much larger than the one of the channel path process in these cases, leading to poor noise suppression.

An alternative approach consists of building unstructured estimates of the observation covariance matrix $R_{\tilde{c}\tilde{c}}$ and the channel autocorrelation sequence $r_{\tilde{c}c}$*, without assuming a specific statistic model. Once such estimates are available the linear prediction filter f can be built according to equation (13) by replacing $R_{\tilde{c}\tilde{c}}$ and $r_{\tilde{c}c}$* with their estimates. In practice it would be more convenient to directly estimate the inverse of $R_{\tilde{c}\tilde{c}}$ to avoid the complication of inverting the estimate of the $R_{\tilde{c}\tilde{c}}$. For this purposes several techniques are available in the literature.

A more practical solution when there are of known pilots, i.e. over the DPCCH and/or CPICH, or reliable hard decisions taken via DD mechanism over the DPDCH are available, consists of estimating directly the Wiener filter coefficients in adaptive fashion, by sufficient training. Adaptive filtering inherently provides tracking of the short-term and long-term channel variations. Tracking and adaptation of the prediction filter can be performed in a continuous fashion or on a block basis, e.g. by adapting the FIR prediction filter every slot.

A lower complexity approach than FIR Wiener FIR linear filtering consists of using a first order IIR LMS-Kalman as linear predictor. The IIR loop gain factor needs to be smaller than one for the IIR filter to be stable. Under the assumption of a parametric channel statistic model it can be shown that the optimal loop gain factor yet depends on the noise-plus interference term and the channel path statistics. Moreover, the optimal loop gain cannot be rendered smaller than one for high Doppler spread and large spreading factors, as it is demonstrated in: J. Baltersee, G. Fock, P. Schultz-Rittich, and H. Meyr, "Performance analysis of phasor estimation algorithms for FDD-UMTS RAKE receiver", *IEEE 6$^{th}$ Symp. on Spread Spectrum Techonologies and Applications*, NJIT, NJ, September 2000 incorporated herein by reference. Therefore, in order to be stable, the LMS-Kalnan linear predictor can no longer be optimal in those cases. Nevertheless, the LMS-Kalman linear predictor is still an optimal solution for low UB mobility (Doppler spread smaller than 222 Hz) and small spreading factor (less than 128).

The above considerations allow estimating the amount of complexity involved by the computation of the optimal prediction filter. This complexity represents a major hurdle for a feasible implementation of the MAP channel estimator within a realistic UE, so that other sub-optimal but less computationally intensive solutions need to be addressed. The presence of the expectation operator in the MAP estimator expressed by equation (11) indicates that any sub-optimal estimator should low-pass filter the instantaneous ML channel estimates expressed by equations (8)-(10). The design and implementation of a sub-optimal low-pass filter for the ML channel estimates (8)-(10) in lieu of the optimal Wiener filter has to achieve a trade-off between complexity saving and performance degradation with respect to the optimal MAP estimator. Very simple low-pass filter structure can be shown to achieve nearly optimal performance in most practical scenarios with significantly reduced complexity. These considerations are all about the practical design of a channel estimation mechanism suitable for a feasible UE. In the light of the previous derivation we shall introduce a low complexity but still nearly optimal DPDCH channel estimation algorithm.

4.3. Joint CPICH-DPCH Based Low Complexity DPDCH Channel Estimation

In section 3.1 we have seen that the channel paths associated with the CPICH and DPCH share a common structure. In particular, it has been shown that both channels associated with the CPICH and DPCH behave in the same way up to said beamforming complex factor β due to the transmit beamforming. The knowledge of said complex factor β for all channel paths allows building an estimate of the DPDCH channel from an estimate of the CPICH channel. This way the DPDCH estimation problem splits into two simpler estimation problems, one of estimating β and another of estimating the CPICH channel c(k). Optimal MAP channel estimation can be considered to estimate the CPICH channel c(k) with significant complexity reduction with respect to the complete joint CPICH-DPCH MAP DPDCH channel estimation problem. The optimal MAP CPICH channel estimate at time instant k is given by the expectation of the ML instantaneous CPICH estimate $\hat{c}_{cpich}(k)$ given all available ML instantaneous CPICH estimates of the form $\hat{c}_{cpich}(n)$ form n≠k. The solution to this problem has the same form as (12) and (13), where the observation column vector $\hat{c}_{ML}$ is to be redefined so as to comprise just the CPICH and not the DPCH ML instantaneous channel estimates (8)-(10), and the cross-correlation vector in equation (13) is to be redefined as $r_{\tilde{c}c}$*=E{$\hat{c}_{ML}$c*(k)}. A detailed derivation of a MAP CPICH channel estimator is provided in said reference J. Baltersee, G. Fock, P. Schultz-Rittich, and H. Meyr, "Performance analysis of phasor estimation algorithms for FDD-UMTS RAKE receiver", *IEEE 6$^{th}$ Symp. on Spread Spectrum Techonologies and Applications*, NJIT, NJ, September 2000. Similar considerations as those mentioned in section 4.3 apply also in this case. If the UE still cannot afford the complexity of a MAP CPICH channel estimate lower complexity approach can be pursued by adopting sub-optimal low pass filtering in lieu of the optimal linear prediction filter. In the following we shall refer to $\tilde{c}_{cpich}(k)$ as an estimate of the CPICH channel c(k) regardless the low pass filter employed for the estimation. Along with an estimate $\tilde{c}_{cpich}(k)$ of the CPICH channel c(k), the UE has to compute an estimate $\hat{\beta}$ of said complex factor β, to build an estimate of the DPDCH channel as $\tilde{c}_{dpdch}(k)$=$\hat{\beta}\tilde{c}_{cpich}(k)$. To this end, we shall derive an optimal ML estimator for β that can exploit both the DPCCH pilot symbols in DA fashion and/or the DPDCH data in a DD fashion, jointly with the pilot symbols provided by the CPICH according to equations (8)-(10).

4.3.1. Maximum Likelihood Estimation of the Beamforming Complex Factor β

In order to build an ML estimate for the factor β we need to build ML estimates of the cross-correlation between DPCH and CPICH instantaneous ML channel estimates, and of the autocorrelation of the CPICH instantaneous ML channel estimates. For this purpose we shall rely on the expressions of the ML instantaneous DPCH and CPICH channel estimates (8)-(10). The theoretical expressions for the DPCH-CPICH ML channel estimates cross-correlation and CPICH ML channel estimate autocorrelation are:

$$\phi_{dc}(l)=E\{\hat{c}_{dpch}(n)\hat{c}^*_{cpich}(n-l)\} \tag{14}$$

and $$\phi_{cc}(l)=E\{\hat{c}_{cpich}(n)\hat{c}^*_{cpich}(n-l)\} \tag{15}$$

respectively, where a correlation lag l≠0 is to be selected for noise suppression, as it will be shown in the following. From equation (8), we have:

$$\hat{c}_{cpich}(n) = c(n) + v_{cpich}(n)$$

$$\hat{c}_{dpch}(n) = w^H a(\theta) c(n) + v_{dpch}(n)$$

where we denote $\beta = w^H a(\theta)$. Under the assumption that the noise terms $v_{cpich}(n)$ and $v_{dpch}(n)$ are independent zero-mean additive white Gaussian noises, expressions (14) and (15) for l≠0 yield to:

$$\phi_{dc}(l) = E\{\hat{c}_{dpch}(n)\hat{c}_{cplch}^*(n-l)\} =$$
$$= \beta E\{c(n)c^*(n-l)\} + \beta E\{c(n)v_{cplch}^*(n-l)\} +$$
$$E\{v_{dpch}(n)c^*(n-l)\} + E\{v_{dpch}(n)v_{cplch}^*(n-l)\} =$$
$$= \beta E\{c(n)c^*(n-l)\}$$

and $$\phi_{cc}(l) = E\{\hat{c}_{cplch}(n)\hat{c}_{cplch}^*(n-l)\} =$$
$$= E\{c(n)c^*(n-l)\} + E\{c(n)v_{cplch}^*(n-l)\} +$$
$$E\{v_{cplch}(n)c^*(n-l)\} + E\{v_{cplch}(n)v_{cplch}^*(n-l)\} =$$
$$= E\{c(n)c^*(n-l)\}$$

respectively. Thus the complex factor β is readily given by:

$$\beta = \frac{\phi_{dc}(l)}{\phi_{cc}(l)} \text{ for any } l \neq 0 \quad (16)$$

A practical implementation requires the expectation operator $E\{\cdot\}$ to be replaced by a feasible estimator yielding estimates $\hat{\phi}_{dc}(l)$ and $\hat{\phi}_{cc}(l)$ for the cross- and autocorrelation (14) and (15) respectively, to build an estimate $\hat{\beta}$ for β according to equation (16). A simple and effective estimate for $\phi_{dc}(l)$ and $\phi_{cc}(l)$ is given by the sample temporal average, i.e.:

$$\hat{\phi}_{dc}(l) = \frac{1}{K_{dpch}} \sum_{n=m}^{K_{dpch}-1+m} \hat{c}_{dpch}(n)\hat{c}_{cplch}^*(n-l) \quad (17)$$

and $$\hat{\phi}_{cc}(l) = \frac{1}{K_{cplch}} \sum_{n=m}^{K_{cplch}-1+m} \hat{c}_{cplch}(n)\hat{c}_{cplch}^*(n-l) \quad (18)$$

where n=m denotes the time instant which the averages (17) and (18) start from. Notice that for l>0 it is needed $K_{cpich} \geq K_{dpch} + l$. The estimates (17) and (18) are consistent estimates and commonly known as sample estimators. They are also known to be ML estimates of the cross and auto-correlation (14) and (15) under the assumption of Gaussian observations, as in our case (see the hereby incorporate reference "B. Porat, *Digital processing of random signals*, Englewood Cliffs, N.J., Prentice-Hall, 1994"). They are also known to be biased estimates for finite $K_{dpch}$, and asymptotically unbiased, i.e. unbiased as $K_{dpch}$ goes to infinity. More-over, it is well known that the ratio of two ML estimates is still a ML estimate. Thus an ML estimate for β is given by:

$$\hat{\beta}_{ML}(l) = \frac{\hat{\phi}_{dc}(l)}{\hat{\phi}_{cc}(l)} = \frac{\frac{1}{K_{dpch}} \sum_{n=m}^{K_{dpch}-1+m} \hat{c}_{dpch}(n)\hat{c}_{cplch}^*(n-l)}{\frac{1}{K_{cplch}} \sum_{n=m}^{K_{cplch}-1+m} \hat{c}_{cplch}(n)\hat{c}_{cplch}^*(n-l)} \quad (19)$$

where the dependence on the lag l is due to the finite number of symbols $K_{dpch}$ and $K_{cpich}$ available in practice. Notice that in the case where $K_{cpich} = K_{dpch}$, the estimator (19) takes the form:

$$\hat{\beta}_{ML}(l) = \frac{\hat{\phi}_{dc}(l)}{\hat{\phi}_{cc}(l)} = \frac{\sum_{n=m}^{K_{dpch}-1+m} \hat{c}_{dpch}(n)\hat{c}_{cplch}^*(n-l)}{\sum_{n=m}^{K_{dpch}-1+m} \hat{c}_{cplch}(n)\hat{c}_{cplch}^*(n-l)} \quad (20)$$

The estimator (20) has the advantage of avoiding the need for computing the ratio $K_{cpich}/K_{dpch}$ and therefore has a reduced complexity with respect to the general estimator (19). In order to further limit the complexity of estimator (20) one might avoid the presence of a DD mechanism to build the ML instantaneous channel estimates over the DPDCH according to equation (10). In this case only the known pilot symbols comprising the DPCCH would be used to form DPCCH ML instantaneous channel estimates expressed by equation (9) and it would result in $K_{dpch} = K_{dpcch}$.

Since equation (16) holds for any l≠0, $\hat{\beta}_{ML}(l)$ expressed by (19) and (20) represents an ML estimate of β for any l≠0. It is also well known that a linear combination of ML estimates is still an ML estimate. Thus in a preferred non-limitative embodiment, in order to improve the estimate of β, one may consider the weighted sum of ML estimates of the cross and auto correlation at different correlation lag l, i.e.:

$$\hat{\beta}_{ML} = \frac{\sum_{l=1}^{L} a_l \hat{\phi}_{dc}(l)}{\sum_{l=1}^{L} b_l \hat{\phi}_{cc}(l)} = \frac{\sum_{l=1}^{L} a_l \sum_{n=m}^{K_{dpch}-1+m} \hat{c}_{dpch}(n)\hat{c}_{cplch}^*(n-l)}{\sum_{l=1}^{L} b_l \sum_{n=m}^{K_{dpch}-1+m} \hat{c}_{cplch}(n)\hat{c}_{cplch}^*(n-l)} \quad (21)$$

where the coefficients $a_l$ and $b_l$ are to be chosen according to the accuracy (expressed in terms of mean square error) of each ML estimates id, $\hat{\phi}_{dc}(l)$ and $\hat{\phi}_{cc}(l)$ (see: B. Porat, "*Digital processing of random signals*", Englewood Cliffs, N.J., Prentice-Hall, 1994 incorporated herein by reference).

Moreover, it can be shown that the estimators (17) and (18) are asymptotically efficient only for the first correlation lags l=1,...,$\overline{L}$, where $\overline{L}$ depends on the statistical properties of the random processes $\hat{c}_{cpich}(n)$ and $\hat{c}_{dpch}(n)$ (namely for l>$\overline{L}$ the variance in the estimate even asymptotically does not attain the Cramer-Rao lower bound, a well known concept for the person skilled in the art, as it is shown hereby in said reference: B. Porat, "*Digital processing of random signals*", Englewood Cliffs, N.J., Prentice-Hall, 1994.

In another preferred non-limitative embodiment, the following weighted sum of ML estimates can be considered:

$$\hat{\beta}_{ML} = \sum_{l=1}^{K} \gamma_l \hat{\beta}_{ML}(l) \qquad (22)$$

where K represents the maximum correlation lag at which the cross and autocorrelation (17) and (18) are estimated. Similar to the estimator (21) the optimal weighting coefficients $\gamma_1$ can be computed based on the accuracy (expressed in terms of mean square error) of each ML estimate $\hat{\beta}_{ML}(l)$. In practice $\gamma_1$ will increase with the accuracy of the estimate $\hat{\beta}_{ML}(l)$, rendering the contribution of the most accurate estimates to the sum (21) more significant than that of less accurate estimates. Similar to estimator (21) the efficiency of the estimates $\hat{\beta}_{ML}(l)$ will decrease as the lag l increases. Thus also in this estimator a maximum lag $\overline{K}$ can be determined for the estimate $\hat{\beta}_{ML}(l)$ to be asymptotically efficient (see the said reference: B. Porat, "Digital processing of random signals", Englewood Cliffs, N.J., Prentice-Hall, 1994) where we remark that it would be in general $\overline{K} \neq \overline{L}$. The derivation of the optimal weight coefficients $a_1$ and $b_1$, or $\gamma_1$ although of theoretical interest, results in far too complex a matter to allow a simple closed form expression suitable for a realistic implementation and is hence beyond the scope of this invention. However, it can be shown that since the accuracy of the estimates $\hat{\beta}_{ML}(l)$ as well as the accuracy of the estimates $\phi_{dc}(l)$ and $\phi_{cc}(l)$ generally decreases as the correlation lag l increases the coefficients $\gamma_1$ and $a_1$ and $b_1$ will decrease accordingly.

In the light of the above considerations the least complex ML estimator with the maximum estimate accuracy is that of equation (20) with l=1, i.e.:

$$\hat{\beta}_{ML}(1) = \frac{\hat{\phi}_{dc}(1)}{\hat{\phi}_{cc}(1)} = \frac{\sum_{n=m}^{K_{dpch}-1+m} \hat{c}_{dpch}(n)\hat{c}^*_{cplch}(n-1)}{\sum_{n=m}^{K_{dpch}-1+m} \hat{c}_{cplch}(n)\hat{c}^*_{cplch}(n-1)} \qquad (23)$$

Notice that estimator (23) has also the advantage of minimizing the delay needed to compute the cross and the autocorrelation at numerator and denominator respectively, reducing the complexity and the need of additional memory storage.

4.3.2. Practical Means for Improving and Tracking the Beamforming Factor Estimate There might be practical circumstances where the beamforming factor $\beta$ can stay constant over several slot periods. This may occur when the BS optimizes the beamforming weight vector w on the basis of the path angles $\theta_p$ and the average energies of the paths. In such cases since those quantities can stay approximately constant over several slot periods the BS will not modify the beamforming weight vector w so that the factor $\beta_p = w^H a(\theta_p)$ for p=1, ..., P will stay approximately constant during the same time period. This fact can be used to improve the accuracy of the estimates (19)-(23) by averaging/filtering the estimates of the cross- and auto-correlation at fixed lag l≠0 (17) and (18) computed over successive slot periods, namely over the period where the factor $\beta$ is constant. Then for that averaging-filtering operation to be properly implemented the UE has to be informed whenever the beamforming factor $\beta$ is abruptly modified either because the angles of the paths have changed and/or the BS has modified the beamforming weight vector w, in order for the UE to reset/reinitialize the averaging-filters memory. Indeed if the averaging/filter memory is not reset, the UE would account for cross-correlation and autocorrelation estimates (16)-(17) corresponding to an out-of-date beamforming factor $\beta$. However, one may notice that there might be no need to reset the averaging-filter memory in the case of slow variations of the beamforming factor $\beta$. Indeed appropriate filtering of successive cross and auto-correlation estimates (17) and (18) inherently performs the tracking of slow variations of the beamforming factory $\beta$. For this purpose we suggest the implementation of a low complexity first-order low pass IR filter with a suited forgetting factor (first-order IIR filtering is well known by the person of ordinary skill in the art). Eventually, in order for the BS to notify the UE about abrupt changes in the transmit beamforming, a signaling overhead is necessary though. If the standard under consideration, e.g. UMTS, does not envisage to support such signaling from the BS to the UE, either the averaging filters have to be removed or the UE needs to implement an additional mechanism able to detect whether an abrupt change occurred in order to make a decision on whether the averaging filter memory is to be reset. Such an additional detection mechanism as well as the cross and auto correlation averaging-filters, clearly come at the expense of complexity increase that might impact the UE design. However, if due to complexity limitation the averaging-filters are not implemented, the BS will not have to signal abrupt beamforming factor changes to the UE avoiding additional network overhead. The UE shall then update the estimate of the beamforming factor every slot, independently of the previous slot estimates. Furthermore one may observe that in this case the UE can keep estimating the factor $\beta$ even independently of the presence of transmit beamforming. Indeed when no transmit beamforming is performed at the BS, $\beta$ will reduce to a real factor representing the transmit amplitude offset between the CPICH and DPCH.

4.3.3. DPDCH Channel Estimation at Different DPCH Symbol Rates

So far, for the sake of simplicity in the derivation we have assumed at a particular instance the spreading factor of the DPCH to be equal to 256, in order for the DPCH and the CPICH to have the same symbol rate (i.e. the same number of chips per symbol). However, as mentioned previously the spreading factor of the DPCH can take on values in the set {2, 4, 8, 16, 32, 64, 128, 256, 512} so as the DPCH symbol rate generally differs from that of the CPICH whose spreading factor is always fixed equal to 256. Hence in a preferred non limitative-embodiment, the instantaneous ML channel estimates (8)-(10) generalize as follows:

$$\hat{c}_{cpich}(n) = s^*_{cpich}(n) y_{cpich}(n) = c(n) + v_{cpich}(n)$$

$$\hat{c}_{dpch}(i) = s^*_{dpch}(i) y_{dpch}(i) = w^H a(\theta) c(i) + v_{dpch}(i) \qquad (24)$$

where, given the DPCH spreading factor M, the index i corresponds to the i-th DPCH symbol spread over M chips, and n corresponds to the n-th CPICH symbol always spread over 256 chips. Then since to any CPICH symbol corresponds 256/M DPCH symbols in order for the previous algorithm to be used either the CPICH or the DPCH ML channel have to be interpolated to match the symbol rate of the other channel estimates.

Moreover, in deriving the ML instantaneous channel estimates (8)-(10), both the CPICH and the DPCH channels are implicitly assumed constant over the longer symbol period of the two channels, namely the Doppler spread is always assumed to be significantly lower than the lowest symbol rate allowed by the standard concerned. We shall briefly show that this assumption holds in practice by considering the case of the UMTS standard. Indeed the lowest symbol rate arises when the spreading factor is maximal, i.e. for M=512. In the UMTS standard the chip rate is fixed equal to 3.84 MHz (see: "3GPP Technical Specifications, Rel. 99, http://www.3gpp.org/specs/specs.html" incorporated herein by reference), so that the lowest symbol rate for the DPCH is equal to 3.84 MHz/512=7.5 kHz. The UMTS standard also envisages supporting wireless mobile services where the UE velocity can be up to 500 km/h, i.e. in the presence of a Doppler spread at most equal to 1 kHz that is still largely below 7.5 kHz for the above assumption to be valid. Then in a preferred non-limitative embodiment, interpolation is done to adapt the ML instantaneous CPICH and DPCH estimates to the lowest symbol rate between said CPICH and DPCH. In particular, when the DPCH spreading factor M is smaller than 256, the interpolation to the CPICH symbol rate is obtained by averaging DPCH ML static channel estimates over a number of symbols equal to 256/M, whereas when M=512, being the DPCH symbol rate lower than that of the CPICH, the average is taken on the CPICH over two consecutive ML instantaneous channel estimates. One can notice that this embodiment has the advantage of not coloring the estimation noise, i.e. noise samples after interpolation are still uncorrelated, so that equation (16) still holds.

4.4. DPDCH Channel Estimation Algorithms

In this section we summarize the steps of the joint CPICH-DPCH MAP DPDCH channel estimation algorithm as well as the joint CPICH-DPCH low-complexity DPDCH channel estimation algorithm derived in sections 4.2 and 4.3 respectively.

4.4.1. Optimal Joint DPCH-CPICH MAP DPDCH Channiel Estimation Algorithm

In this section we provide a summary of the main steps of implementing the optima joint DPCH-CPICH MAP DPDCH channel estimation algorithm described above. The following steps are to be performed to provide an optimal MAP DPDCH estimate according to (11).

1. Compute the ML instantaneous CPICH and DPCH channel estimates $\hat{c}_{cpich}(n)$ and $\hat{c}_{dpch}(i)$ according to equations (8)-(10) and the generalization (23).
2. Perform interpolation of the ML instantaneous DPCH and CPICH channel estimates obtained above to the lowest symbol rate of said DPCH and CPICH, i.e.:
    if the DPCH spreading factor M<256 the DPCH ML channel estimates are to be interpolated in order to match the CPICH symbol rate,
    if the DPCH spreading factor M=512 the CPICH ML channel estimates are to be interpolated in order to match the DPCH symbol rate,
    if the DPCH spreading factor M=256 no interpolation is needed.
    The ML instantaneous channel estimates thus interpolated are collected in the following vectors:

$\hat{c}_{cpich} = [\hat{c}_{cpich}(n-K_{cpich}+1) \ldots \hat{c}_{cpich}(n)]^T$ $\hat{c}_{dpch} = [\hat{c}_{dpch}(i-K_{dpch}+1) \ldots \hat{c}_{dpch}(i)]^T$ To further reduce the complexity we limit the estimates $\hat{c}_{dpch}(n-K_{dpch}+1) \ldots \hat{c}_{dpch}(n)$ to the estimates over the DPCCH $\hat{c}_{dpcch}(i-K_{dpcch}+1), \ldots \hat{c}_{dpcch}(i)$ in order to avoid the implementation of a DD mechanism necessary to provide pilot symbol estimates over the DPDCH. The vector $\hat{c}_{ML} = [\hat{c}_{dpch}^T \hat{c}_{cpich}^T]^T$ is formed.
3. Build the optimal linear prediction filter f according to equation (13) either by implementing one of the techniques described in section 4.3
4. Filter the ML instantaneous channel estimates $\hat{c}_{ML} = [\hat{c}_{dpch}^T \hat{c}_{cpich}^T]^T$ obtained at step 3 with the linear prediction filter computed at step 4 according to equation (12) to obtain a MAP DPDCH channel estimate $\tilde{c}_{dpdch-MAP}(k)$
5. If the DPCH spreading factor M<256, the above DPDCH channel estimate $\tilde{c}_{dpdch-MAP}(k)$ is to be interpolated at the DPCH symbol rate to be properly used. The least complexity interpolation technique consists of repeating the estimate $\tilde{c}_{dpdch-MAP}(k)$ 256/M times, if M≦256 and averaging over two successive estimates $\tilde{c}_{dpdch-MAP}(k)$ if M=512. In a general preferred embodiment more sophisticated interpolation techniques can be adopted (e.g., linear, quadratic, spline interpolation)
6. Repeat steps 1 to 6 for all paths p=1, . . . , P assigned to the RAKE receiver fingers.

4.4.2. Joint CPICH-DPCH Low Complexity DPDCH Channel Estimation Algorithm In this section we summarize the main steps of the low complexity joint CPICH-DPCH ML optimal DPDCH channel estimation algorithm. The following steps are to be implemented to estimate the DPDCH channel $\tilde{c}_{dpdch}(k)$ at time k within the UE.

1. Compute the ML instantaneous CPICH and DPCH channel estimates $\hat{c}_{cpich}(n)$ and $\hat{c}_{dpch}(i)$ according to equations (8)-(10) and the generalization (23).
2. Perform interpolation of the above obtained ML instantaneous DPCH and CPICH channel estimates obtained above to the lowest symbol rate of said DPCH and CPICH, i.e.
    if the DPCH spreading factor M<256 the DPCH ML channel estimates are to be interpolated in order to match the CPICH symbol rate,
    if the DPCH spreading factor M=512 the CPICH ML channel estimates are to be interpolated in order to match the DPCH symbol rate,
    if the DPCH spreading factor M=256 no interpolation is needed.
3. The ML instantaneous channel estimates thus interpolated are collected in the following vectors:

$\hat{c}_{cpich} = [\hat{c}_{cpich}(n-K_{cpich}+1) \ldots \hat{c}_{cpich}(n)]^T$ $\hat{c}_{dpch} = [\hat{c}_{dpch}(i-K_{dpch}+1) \ldots \hat{c}_{dpch}(n)]^T$ with l>0. In our implementation we shall set l=1 and $K_{cpich}=K_{dpch}$. To further reduce the complexity we limit the estimates $\hat{c}_{dpch}(n-K_{dpch}+1), \ldots, \hat{c}_{dpch}(n)$ to the estimates over the DPCCH $\hat{c}_{dpcch}(n-K_{dpcch}+1), \ldots, \hat{c}_{dpcch}(n)$ in order to avoid the implementation of a DD mechanism necessary to provide pilot symbol estimates over the DPDCH.
4. Build CPICH auto correlation and DPCH CPICH cross correlation at lag l>0 of the form (17) and (18), i.e., $$\sum_{n=m}^{K_{dpch}-1+m} \hat{c}_{dpch}(n)\hat{c}_{cplch}^*(n-l) \text{ and } \sum_{n=m}^{K_{dpch}-1+m} \hat{c}_{cplch}(n)\hat{c}_{cplch}^*(n-l)$$

5. Build an ML estimate of the beamforming complex factor β as $$\hat{\beta}_{ML}(l) = \frac{\hat{\phi}_{dc}(l)}{\hat{\phi}_{cc}(l)} = \frac{\sum_{n=m}^{K_{dpch}-1+m} \hat{c}_{dpch}(n)\hat{c}_{cpich}^*(n-l)}{\sum_{n=m}^{K_{dpch}-1+m} \hat{c}_{cpich}(n)\hat{c}_{cpich}^*(n-l)}$$

where we shall set l=1 according to equation (23).

6. Build an accurate (e.g. MAP) CPICH channel estimate $\tilde{c}_{cpich}(k)$ of the true CPICH channel $c_{cpich}(k)$ by suitable low-pass filtering the ML CPICH instantaneous channel estimates $\hat{c}_{cpich} = [\hat{c}_{cpich}(n-K_{cpich}+1) \ldots \hat{c}_{cpich}(n)]^T$. To reduce the complexity of the estimation filter we may consider only a part of the vector $\hat{c}_{cpich}$ of the ML CPICH instantaneous channel estimates for low pass filtering.

7. Build a DPDCH channel estimate $\tilde{c}_{dpdch}(k)$ of the true DPDCH channel as $$\tilde{c}_{dpdch}(k) = \hat{\beta}_{ML}\tilde{c}_{cpich}(k)$$

8. If the DPCH spreading factor M<256, the above DPDCH channel estimate $\tilde{c}_{dpdch}(k) = \hat{\beta}_{ML}\tilde{c}_{cpich}(k)$ is to be interpolated at the DPCH symbol rate to be properly used. As previously mentioned, the least complexity interpolation technique consists of repeating the estimate $\tilde{c}_{dpdch}(k) = \hat{\beta}_{ML}\tilde{c}_{cpich}(k)$ 256/M times, if M≤256 and averaging over two successive estimates $\tilde{c}_{dpdch}(k) = \hat{\beta}_{ML}\tilde{c}_{cpich}(k)$ if M=512. In a general preferred embodiment more sophisticated interpolation techniques can be adopted (e.g., linear, quadratic, spline interpolation).

9. Repeat steps 1 to 8 for all paths p=1, . . . ,P assigned to the RAKE receiver fingers In a non-limitative preferred embodiment, the CPICH multipath coefficient's estimate at step 6 is done by a linear prediction as described, e.g., in the document: J. Bsltersee, G. Fock, P. Schultz-Rittich, and H. Meyr, "Performance analysis of phasor estimation algorithms for FDD-UMTS RAKE receiver", IEEE 6$^{th}$ *Symp. on Spread Spectrum Techonologies and Applications*, NJIT, NJ, September 2000 (incorporated herein by reference).

4.4.3. Relation to DPCCH Based DPDCH Channel Estimation

Some authors (see e.g.: "TSG RAN WG 4 meeting #17, R4-010594 Ericsson, *Dedicated Pilots*, May 2001," "TSG RAN WG 4 meeting #17, R4-010528 Nokia, *Proposal for user-specific beamforming for UTRA FDD*, May 2001" have addressed the problem of DPDCH channel estimation in the presence of transmit beamforming. Mainly they conclude that since only the DPCH is affected by the transmit beamforming only the information available from the DPCH channel is to be used for DPDCH channel estimation under those circumstances. In particular when DD DPDCH ML channel estimates cannot be used due to complexity limitations, they recommend performing DPDCH channel estimation only exploiting the a-priori knowledge of the DPCCH pilot symbols. We shall notice that when it is viable both the algorithms described here by making use of information available from both the CPICH and the DPCCH have two major advantages with respect to a DPDCH channel estimation only based on the DPCCH pilots. First, the scarceness of pilot symbols provided by the DPCCH (from 1 to a maximum of 16 depending on the slot format see the hereby incorporated reference "3GPP Technical Specifications, Rel. 99)", limits the accuracy of DPDCH channel estimate because of lack of sufficient noise and interference suppression. Secondly, as mentioned above, within a DPCH time-slot the DPCCH pilot symbols are not transmitted continuously as the CPICH pilot symbols, but they are time-multiplexed with the unknown data symbols comprising the DPDCH. In the presence of high Doppler spread, i.e. at high UE velocity, such structure of the DPCH time-slot might pose the problem of estimating the channel path coefficient $c_{dpdch}(k)$ during the absence of known pilot symbols as during the DPDCH period, unless the CPICH pilot symbols which are continuously transmitted are not exploited as well. Indeed if the Doppler spread is very low compared with the slot rate, the channel $c_{dpdch}(k)$ will vary so slowly within a slot period that it could be considered approximately constant over that period. Thus the channel estimate provided over the DPCCH can be considered valid for the whole DPDCH period. In other words there is no practical need of updating the DPDCH channel estimate at a higher rate than the slot rate. Conversely, if the Doppler spread is of the same order of magnitude as the slot rate or even larger, the assumption that the DPDCH channel is approximately constant over a slot period is no longer valid. For instance, referring to the UMTS standard, a slot comprises 2560 chip) periods yielding a slot rate of 1.5kHz whereas, under extreme cases, the system is supposed to cope with Doppler spread up to 1kHz. Therefore, in such cases the channel estimated over the DPCCH cannot be considered a valid approximation of the true channel $c_{dpdch}(k)$ for the entire successive DPDCH period. Under these circumstances one should resort to interpolation and prediction techniques or yet implement a DD mechanism similar to the one previously described that uses hard decision taken on the DPDCH data symbols as known pilots to update the channel estimates in order to update at the appropriate rate the channel estimate over the DPDCH period between two consecutive DPCCH bursts of known pilot symbols. A DPDCH channel estimator, including such a tracking mechanism for the channel estimates is likely to be too computationally demanding to be feasible. Furthermore, under certain practical circumstances, such as when the DPCCH logical channel consists of only a single pilot symbol per slot, that approach would definitely yield poor performance. The joint CPICH-DPCH MAP DPDCH channel estimation algorithm represents a solution to this problem since it implicitly performs prediction of the true DPDCH channel based on the whole available information adapting the prediction filter to the actual Doppler spread and number of DPCCH known pilot symbols. Similarly, also the second low complexity algorithm proposed here inherently exploits the presence of the known pilot symbols over both the DPCCH and CPICH logical channels and allows tracking of the DPDCH channel variations even at high Doppler spread. The latter algorithm results are more attractive from a practical implementation standpoint though due to the low complexity involved and the nearly optimal performance. Indeed the second DPDCH channel estimation algorithm, even in its least complexity instance, builds an estimate of $\hat{\beta}$ of the beamforming complex factor β, jointly accounting for the DPCCH and CPICH available information (i.e. all available known pilot symbols), and provides up-to-date estimates of the DPDCH channel by multiplying the estimated factor $\hat{\beta}$ by the channel estimate $\hat{\beta}_{cpich}(n)$ computed relying on the CPICH pilot symbols. The continuous provision of known pilot symbols over the CPICH channel can be easily exploited by the UE to track the variations due to the Doppler spread of the channel path coefficient c(k) by continuously updating the CPICH channel estimate $\tilde{c}_{cpich}(k)$. The tracking of the DPDCH channel is inherently obtained as the product $\tilde{c}_{dpdch}(k) = \hat{\beta}_{ML}\tilde{c}_{cpich}(k)$. Finally we shall remark that within our second algorithm the DPCCH pilots are not directly used to compute a DPDCH channel estimate but only to compute an estimate of the factor β. If necessary and/or if the UE can afford the increased complexity hard decision taken, the DPDCH can be used as pilot symbols to improve the estimate of β as represented by the equations derived above.

4.4.4. Algorithms Working Limitations

In order to setup a communication in any mobile communication system, a mobile terminal UE at power-up needs to listen to the network and acquire a certain number of parameters related to the operator, the BS with which the UE will start the communication, the type of service required etc. Prior to the useful data transmission the UE has primarily to perform a certain synchronization procedures to acquire a BS. Within the general framework of DS-CDMA systems suitable for implementing a RAKE as receiver at the mobile terminal UE, there exists a preliminary synchronization phase that provides along with other parameters and time reference estimates, also estimates of the time-delays $\tau_p$, and the average energies associated with the paths comprising the channel impulse response from the BS concerned. In the UMTS standard the mobile terminal UE generally estimates the delays of both paths and average energies by exploiting the CPICH. Based on those estimates the RAKE receiver fingers can be properly setup, as it is well known by the person skilled in the art. According to the methods of the invention described above, we have implicitly assumed that when the receiver can detect a path and estimate the associated delay on the CPICH during the synchronization mechanism, a corresponding path at the same delay exists on the DPCH even though with a different complex amplitude. As we have seen, this assumption allowed the derivation of a DPDCH channel estimation algorithm with low complexity, good performances, and high flexibility, able to cope with the problem of DPDCH channel estimation in the presence of transmit beamforming.

In the light of the above it will be noted that under certain circumstances the energy associated with a path might be high over the CPICH-channel and fairly low over the DPCH channel. In particular a path can be strong enough to be detected over the CPICH channel by the synchronization mechanism, while being too weak to be detected over the DPCH channel. Conversely, it may happen that a path that carries significant useful signal energy on the DPCH channel is actually undetectable on the CPICH channel, and therefore not detectable by the synchronization mechanism operating based only on the CPICH channel. The first case would lead to an estimate of β with a very small magnitude. Thus, the algorithms described above would still work properly and the RAKE receiver would simply drop the finger as the corresponding DPCH channel path's energy becomes too small. The second case is much more critical because there would be no way to exploit the information provided by synchronization mechanism operating based only on the CPICH channel. Under these circumstances any of the two DPDCH channel estimation algorithms would properly operate and one should first search for paths associated with the DPCH channel by implementing a synchronization mechanism based on the DPCCH. Such a further synchronization mechanism would involve a significant complexity increase along with several real-time management complications, and would likely lead to poor performance due to the limited number of DPCCH pilot symbols per slot as we have previously seen.

5. DPDCH Channel Estimator Architecture

In this section we provide architecture schematics for the implementation of the previously described DPDCH channel estimation algorithms.

Figure 3:
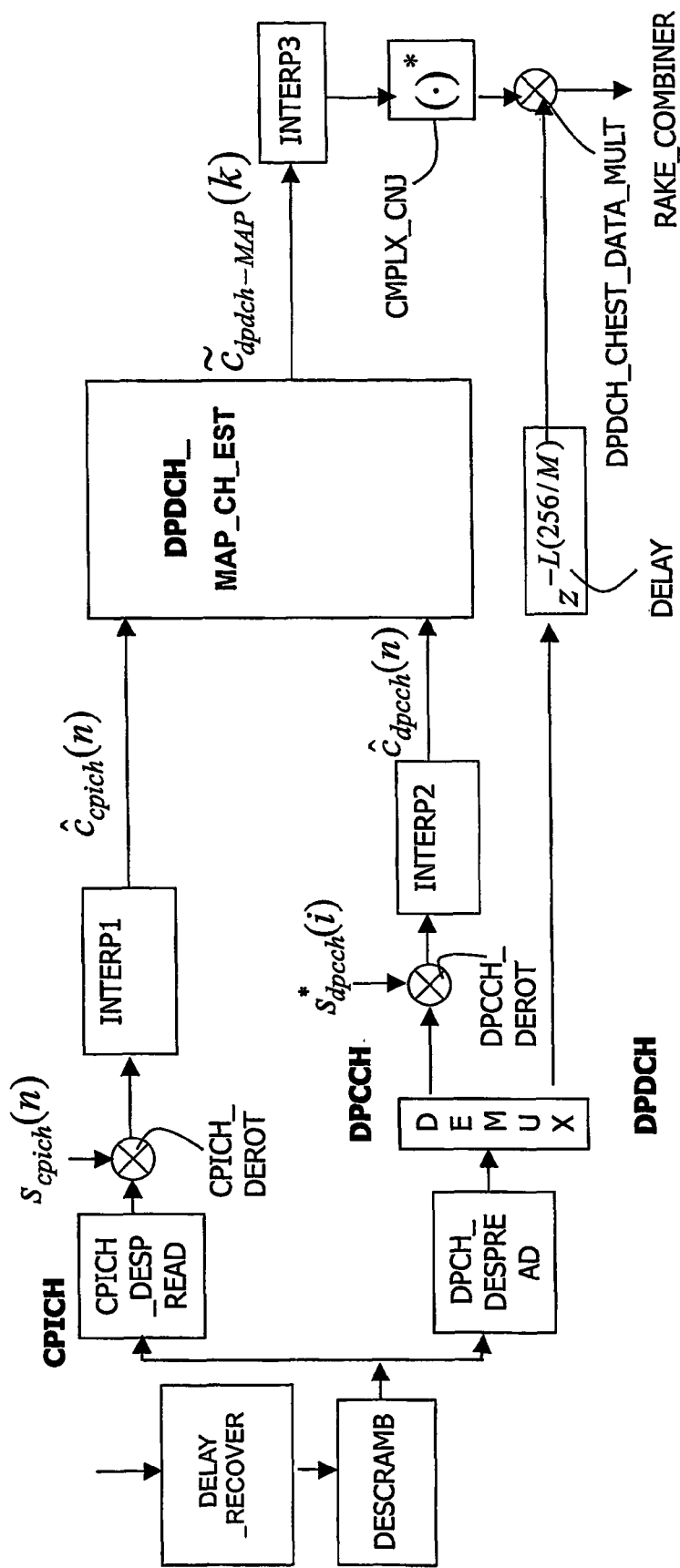
FIG. 3 illustrates an architecture schematic implementing the first method for DPDCH channel estimation according to the invention of FIG. 1.

5.1. Optimal Joint DPCH-CPICH MAP DPDCH Channel Estimation Algorithm Architecture FIG. 3 represents a schematic architecture for an implementation of a RAKE receiver comprising the proposed DPDCH channel estimator using the algorithm summarized by steps 1-5 described in section 0. In particular FIG. 3 describes a portion of a single finger of the RAKE receiver, comprising:

A delay recovering block denoted DELAY_RECOVER compensating the delay associated with the path assigned to the finger of interest A descrambling block denoted DESCRAMB A CPICH despreading block, associated with the CPICH channel denoted CPICH_DESPREAD A DPCH despreading block associated with the DPCH channel denoted DPCH_DESPREAD A CPICH symbol derotation block, denoted CPICH_DEROT, removing the modulation by the n-th CPICH pilot symbol A demultiplexer block denoted DEMUX to recover according to the current DPCH slot format, the pilot symbols comprising the DPCCH and separate the data symbols comprising the DPDCH to be decoded A DPCCH symbol derotation block, denoted DPCCH_DEROT, removing the modulation by the i-th DPCCH pilot symbol Two interpolation blocks, one for the CPICH denoted INTERP1 and another for the DPCH denoted INTERP2. The first interpolation block INTERP1 is enabled when the DPCH spreading factor M=512. The second interpolation block INTERP2 is enabled only when the DPCH spreading factor M<256. No interpolation block is enabled when M=256 (see step 2 section 4.4.1).

A joint CPICH-DPCH MAP DPDCH channel estimation low pass filter denoted DPDCH_MAP_CH_EST, involving a delay of L CPICH symbol periods, and providing the estimates $\tilde{c}_{dpdch\text{-}MAP}(k)$ according to step 4 of section 4.4.1.

A delay line of L(256/M) DPCH symbol periods denoted DELAY necessary to temporally align the MAP DPDCH channel estimate $\tilde{c}_{dpdch\text{-}MAP}(k)$ with the DPDCH data symbols An interpolation block denoted INTERP3 to adapt the estimate at the CPICH symbol rate to the DPCH symbol rate, according to step 5 of section 4.4.1.

A block denoted CMPLX_CNJ, computing the complex conjugate of the MAP DPDCH channel estimate after interpolation to the DPCH symbol rate at the output of the block INTERP3, necessary to the RAKE combiner, as it is well known by the person skilled in the art A multiplier block denoted DPDCH_CHEST_DATA_MULT that computes the product of the time-aligned DPDCH symbols and the corresponding complex conjugate DPDCH channel estimate. The product result is then sent to the RAKE receiver combiner, denoted RAKE_COMBINER The scheme depicted in FIG. 3 is to be replicated for all RAKE fingers. The output of the multiplier block DPDCH_CHEST_DATA_MULT of each finger is summed up by the RAKE combiner RAKE_COMBINER to form the output of the RAKE receiver as is well known by the ordinary skilled person.

In practice, in a preferred embodiment, nearest neighbor interpolation will be adopted for the implementation of all the interpolation blocks INTERP1, INTERP2, and INTERP3, as it is shown to be a proper solution for this purpose in terms of complexity and performance trade-off. Nearest neighbor interpolation is the least complexity interpolation method. It actually saves complexity at the expense of a higher signal distortion than that resulting with more sophisticated interpolation techniques. However it can be shown that the actual amount of signal distortion yielded by that interpolation method is significantly below the noise and interference for practical ranges of signal, interference, and noise levels. Therefore, the additional signal distortion due to nearest neighbor interpolation is actually negligible compared with the effects of the noise and interference so as not affecting the receiver performances.

Figure 4:
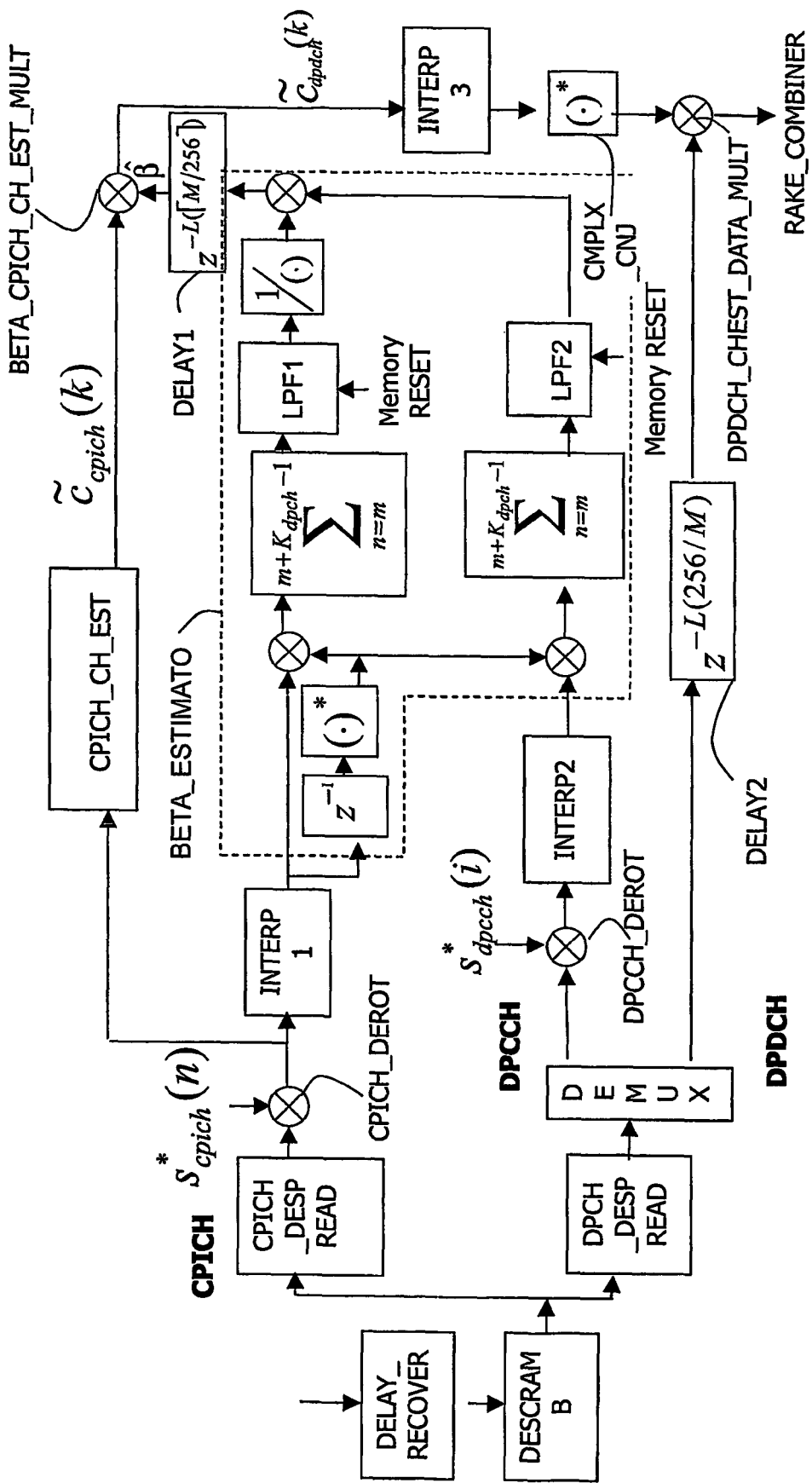
FIG. 4 illustrates an architecture schematic implementing the second method for DPDCH channel estimation according to the invention of FIG. 2.

5.2. Joint CPICH-DPCH Low Complexity DPDCH Channel Estimation Algorithm Architecture FIG. 4 represents a schematic architecture for an implementation of a RAKE receiver comprising the proposed DPDCH channel estimator using the algorithm summarized by steps 1-8 described in section 4.4.2. In particular FIG. 4 describes a portion of a single finger of the RAKE receiver, comprising:

- A delay recovering block denoted DELAY_RECOVER compensating the delay associated with the path assigned to the finger of interest
- A descrambling block denoted DESCRAMB
- A CPICH despreading block, associated with the CPICH channel denoted CPICH_DESPREAD
- A DPCH despreading block associated with the DPCH channel denoted DPCH_DESPREAD
- A CPICH symbol derotation block, denoted CPICH_DEROT, removing the modulation by the n-th CPICH pilot symbol
- A demultiplexer block denoted DEMUX to recover according to the current DPCH slot format, the pilot symbols comprising the DPCCH and separate the data symbols comprising the DPDCH to be decoded
- A DPCCH symbol derotation block, denoted DPCCH_DEROT, removing the modulation by the i-th DPCCH pilot symbol
- A CPICH channel estimator low passfilter denoted CPICH_CH_EST, involving a delay of L CPICH symbol periods, and providing the estimates $\hat{C}_{cpich}(k)$ according to step 6 of section 4.4.2.
- The actual estimator of the beamforming factor β, which comprises two interpolation blocks, one for the CPICH denoted INTERP1 and another for the DPCH denoted INTERP2. The first interpolation block INTERP1 is enabled when the DPCH spreading factor M=512. The second interpolation block INTERP2 is enabled only when the DPCH spreading factor M<256. No interpolation block is enabled when M=256 see step 2 section 4.4.2.
- A delay line of L CPICH symbol periods denoted DELAY1 necessary to temporally align the CPICH channel estimate $\tilde{c}_{cpich}(k)$ with the up-to-date estimate $\hat{\beta}$ of the beamforming factor β
- A delay line of L(256/M) DPCH symbol periods denoted DELAY2 necessary to temporally align the CPICH channel estimate $\tilde{c}_{cpich}(k)$ with the DPDCH data symbols
- A low-pass-filter denoted LPF1 for the DPCH-CPICH cross-correlation estimate and an LPF denoted LPF2 for the CPICH autocorrelation estimate to be enabled when the UE is aware that the beamforming factor 63 stays constant. The LPF memories are to be reset as the UE detects that the beamforming complex factor has abruptly changed (either via signaling from the BS or via a suitable detection mechanism implemented within the UE). Both filters LPF1 and LPF2 are not to be used if the UE has no means to detect abrupt changes of the beamforming complex factor.
- A multiplier denoted BETA_CPICH_CH_EST_MULT computing the product $\hat{\beta}_{ML}\tilde{c}_{cpich}(k)$.
- An interpolation block denoted INTERP3 to adapt the estimate at the CPICH symbol rate $\tilde{c}_{dpdch}(k)=\hat{\beta}_{ML}\tilde{c}_{cpich}(k)$ obtained at step 7 to the DPCH symbol rate, according to step 8 of section 4.4.2.
- A block denoted CMPLX_CNJ, computing the complex conjugate of the DPDCH channel estimate after interpolation to the DPCH symbol rate at the output of the block INTERP3, necessary for the RAKE combiner, as is well known by the person skilled in the art
- A multiplier block denoted DPDCH_CHEST_DATA_MULT that computes the product of the time-aligned DPDCH symbols and the corresponding complex conjugate DPDCH channel estimate. The product result is then sent to the RAKE receiver combiner, denoted RAKE_COMBINER.

The scheme depicted in FIG. 4 is to be replicated for all RAKE fingers. The output of the multiplier block DPDCH_CHEST_DATA_MULT of each finger is summed up by the RAKE combiner RAKE_COMBINER to form the output of the RAKE receiver as it is well known by the ordinary skilled person.

In practice, in a preferred embodiment, also in this case nearest neighbor interpolation will be adopted for the implementation of all the interpolation blocks INTERP1, INTERP2, and INTERP3, as is shown to be a proper solution for this purpose in terms of complexity and performance trade-off. Indeed the same considerations on nearest neighbor interpolation had done in section 0 on the joint CPICH-DPCH MAP DPDCH channel estimation algorithm hold in the case of the joint CPICH-DPCH low complexity DPDCH channel estimation algorithm as well.

6. Concluding Remarks

It is to be understood that the present invention is not limited to the aforementioned embodiments and variations and modifications may be made without departing from the spirit and scope of the invention as defined in the appended claims. In this respect, the following concluding remarks are made.

It is to be understood that the present invention is not limited to the aforementioned UMTS application. It can be used within any application of DS-CDMA where the communication standard envisages the presence of two logical channels, i.e. a common pilot channel, comprising symbols or signal waveform(s) known at the mobile terminal UE, and a dedicated channel comprising unklown data symbols and, in a preferred but not limitative embodiment, also dedicated known pilot symbols or signal waveform(s).

It has to be understood that the present invention can be applied in the uplink communication, from the mobile terminal UE to the base station BS, when the mobile terminal UE the employs transmit beamforming.

It is to be understood that the methods according to the present invention are not limited to the aforementioned implementation. There are numerous ways of implementing functions of the methods according to the invention by means of items of hardware or software, or both, provided that a single item of hardware or software can carry out several functions. It does not exclude an assembly of items of hardware or software or both carrying out a function. For instance, algorithm steps can be combined, thus forming a single function without modifying the method of channel estimate with transmits beamforming in accordance with the invention.

Said hardware or software items can be implemented in several manners, such as by means of wired electronic circuits or by means of an integrated circuit that is suitably programmed, respectively. The integrated circuit is to be part of a receiver that can be contained in a computer, in a mobile communication handset, in a base-station, or in any other communication system device. Said receiver comprises means of the receiver adapted to make all necessary operations to support a certain type of communication services (i.e. operations of de-scrambling, de-spreading, etc.) said means being hardware or software items as stated above. In a similar fashion, the first estimator within the receiver comprises maximum likelihood estimation means adapted to make the ML instantaneous estimates of steps 1 and 3, interpolation means adapted to make rate matching as in step 2, optimal MAP DPDCH channel multipath coefficient estimation means adapted to make the DPDCH estimates of step 4, interpolation means adapted to make rate matching as in step 5, as previously described, said means being hardware or software items as stated above. In the same way, the second estimator within the receiver comprises maximum likelihood estimation means adapted to make the ML instantaneous estimates of steps 1 and 3, interpolation means adapted to make rate matching as in step 2, correlation estimation means adapted to make the correlations estimates of step 4, beamforming complex factor estimation means that are adapted to make the factor complex estimate of step 5, a first multipath coefficient estimation means adapted to make said CPICH multipath coefficient estimate of step 6, a second multipath coefficient estimation means that are adapted to make said DPDCH multipath coefficient estimate of step 7, interpolation means adapted to make rate matching as in step 8, as described previously, said means being hardware or software items as stated above stated. Of course, as mentioned above, said means can be an assembly of items of hardware or software or both carrying out a function, or a single item carrying out several functions.

The integrated circuit comprises a set of instructions. Thus, said set of instructions contained, for instance, in a computer programming memory or in a stand-alone receiver memory may cause the computer or the receiver to carry out the different steps of the estimate methods.

The set of instructions may be loaded into the programming memory by reading a data carrier such as, for instance, a disk. A service provider can also make the set of instructions available via a communication network such as, for example, the Internet.

Any reference sign in the following claims should not be construed as limiting the claim. It will be obvious that the use of the verb "to comprise" and its conjugations does not exclude the presence of any other steps or elements besides those defined in any claim. The article "a" or "an" preceding an element or step does not exclude the presence of a plurality of such elements or steps.

The invention claimed is:

1. A method for estimating a first and second propagation channel being modelled as a linear superposition of finite number of discrete multipath components following an uncorrelated-scattering wide-sense stationary model, with a receiver, comprising the steps of:
accounting for a structure of the first and second propagation channels, wherein the first propagation channel is associated with a common pilot channel and the second propagation channel is associated with a dedicated physical channel, wherein the first propagation channel is transmitted without any beam forming and the second propagation is subject to transmit beam forming, wherein the first and second propagation channels are based on a common structure of corresponding propagation channels, one of the channels comprising two sub-channels including a dedicated physical data channel and a dedicated physical control channel (DPDCH, DPCCH);
providing channel estimation of the first propagation channel based on pilots used for computing time varying multipath coefficient $c_p(t)$ and delay $\tau_p$ representative of the common pilot channel;
providing channel estimation of the second propagation channel, wherein the time varying multipath complex coefficient $c_p(t)$ and the delay $\tau_p$ used in the estimation of the first propagation channel are utilized in the channel estimation of the second propagation channel and at least a complex coefficient $\beta_p c_p(t)$ where $\beta_p$ comprises a beamforming complex factor.

2. The method of claim 1, wherein said second propagation channel corresponds to a first sub-channel (DPDCH), and
wherein the providing step further comprises providing estimates of each multipath component ($p=1, \ldots, P$) complex coefficient ($\beta_p c_p(t)$) according to a maximum-a-posteriori (MAP) optimization criterion accounting for the whole available information, comprising the steps of:
building a second channel comprising a dedicated physical channel (DPCH) and a first channel comprising a common pilot channel (CPICH) having instantaneous maximum likelihood (ML) channel multipath complex coefficients estimates ($\hat{c}_{dpch}(n)$, and $\hat{c}_{pich}(n)$);
performing interpolation of the above obtained ML instantaneous second (DPCH) and first (CPICH) channel multipath complex coefficient estimates ($\hat{c}_{dpch}(n)$), and ($\hat{c}_{pich}(n)$) to a lowest symbol rate of said second (DPCH) and first (CPICH) logical channels;
computing an optimal linear prediction filter (f) according to a joint second and first channels (DPCH-CPICH) maximum-a-posteriori (MAP) criterion;
filtering the interpolated ML instantaneous second (DPCH) and first (CPICH) channel multipath complex coefficient estimates obtained at the performing interpolation step with said optimal linear prediction filter in order to obtain a MAP first sub-channel (DPDCH) multipath coefficient estimate ($\tilde{c}_{dpch\text{-}MAP}(k)$); and
interpolating said MAP first sub-channel (DPDCH) multipath coefficient estimate ($\tilde{c}_{dpch\text{-}MAP}(k)$) to the second logical channel (DPCH) symbol rate when said symbol rate is lower than the first logical channel (CPICH) symbol rate.

3. The method of claim 2, wherein the first logical channel (CPICH) maximum likelihood channel multipath coefficient estimates ($\hat{c}_{pich}(n)$) are computed based on the a-priori knowledge of some pilot symbols forming said first logical channel (CPICH).

4. The method of claim 2, wherein the second logical channel (DPCH) maximum likelihood channel multipath coefficient estimates ($\hat{c}_{dpch}(n)$), related to the second sub-channel (DPCCH), are computed based on the a-priori knowledge of the pilot symbols forming said second sub-channel (DPCCH).

5. The method of claim 2, wherein the second logical channel (DPCH) maximum likelihood channel multipath coefficient estimates ($\hat{c}_{dpch}(n)$) related to the first sub-channel (DPDCH) are computed by a decision-direct mechanism.

6. The method of claim 2, wherein the interpolation of step is performed by nearest neighbour interpolation.

7. The method of claim 2, wherein the optimal linear prediction filter is built according to the maximum-a-posteriori optimization criterion, based on the interpolated maximum likelihood channel multipath coefficients estimates ($\hat{c}_{dpch}(n)$ and ($\hat{c}_{pich}$(n)) related to said first (CPICH) and second (DPCH) logical channels in order to provide an optimal by joint second and first channel (DPCH-CPICH) maximum-a-posteriori first sub-channel (DPDCH) multipath coefficient estimate ($\tilde{c}_{dpch\text{-}MAP}$(k)).

8. A communication system using the method as claimed in claim 1, when information data are transmitted through a beamforming system.

9. A method for estimating a propagation channel in a presence of transmit beamforming characterized in that said propagation channel corresponds to a first sub-channel comprising a dedicated physical data channel (DPDCH) and that said method provides estimates of each multipath component (p=1, . . . , P) complex coefficient, accounting for the whole available information associated with two logical channels including a common pilot channel and a dedicated physical channel (CPICH, DPCH) and corresponding propagation channels with a receiver, comprising the steps of:

building a second channel comprising (DPCH) and a first channel comprising (CPICH) having instantaneous maximum likelihood (ML) channel multipath coefficients estimates ($\hat{c}_{dpch}$(n) and ($\hat{c}_{pich}$(n);

performing interpolation of said ML instantaneous first (DPCH) and second (CPICH) channel multipath coefficient estimates ($\hat{c}_{dpch}$(n) and ($\hat{c}_{pich}$(n)) to the lowest symbol rate of said second (DPCH) and first (CPICH) logical channels;

building an optimal maximum a posteriori estimate ($\tilde{c}_{cpich\text{-}MAP}$(k)) of the first (CPICH) channel multipath coefficient ($\tilde{c}_{cpich}$(k));

building an estimate of a cross-correlation ($\hat{\phi}_{dc}$(l)) between the first (CPICH) and second (DPCH) channel multipath coefficient instantaneous maximum likelihood estimates obtained at step 2 ($\hat{c}_{dpch}$ and $\hat{c}_{pich}$) and an estimate of an autocorrelation ($\hat{\phi}_{dc}$(l)) between the (CPICH) channel multipath coefficient instantaneous maximum likelihood estimates ($\hat{c}_{pich}$) of step 1 and 2 at non-zero-correlation lag (l≠0) for noise suppression;

building an estimate ($\hat{\beta}$) of a beamforming complex factor ($\beta$) of said correlation and autocorrelation estimates;

building a first sub-channel including a dedicated physical data channel (DPDCH) multipath coefficient estimate ($\tilde{c}_{cpich}$(k)) as a product of the estimates obtained at building an optimal step ($\tilde{c}_{cpich\text{-}MAP}$(k)) and building an estimate step ($\hat{\beta}$), and interpolating said first sub-channel (DPDCH) multipath coefficient estimate ($\hat{c}_{cpich}$(k)) to the second logical channel (DPCH) symbol rate when sad symbol rate is lower than the first logical channel (CPICH) symbol rate.

10. The method of claim 9, wherein a maximum likelihood estimate of the second (DPCH) corresponding propagation channel and first (CPICH) corresponding propagation channel cross-correlation ($E\{\hat{c}_{dpch}(n)\hat{c}^*_{pich}(n-l)\}$) and a maximum likelihood estimate of the first (CPICH) corresponding propagation channel autocorrelation ($E\{\hat{c}_{dpch}(n)$ and $\hat{c}^*_{pich}(n-l)\}$ are computed based on the sample moments (($\hat{\phi}_{dc}$(l)) and ($\hat{\phi}_{cc}$(l)) of the first (CPICH) and second (DPCH) channel maximum likelihood estimates ($\hat{c}_{dpch}$(n), and ($\hat{c}_{pich}$(n)).

11. The method of claim 9, for the computation of the estimate of said complex beamforming factor ($\beta$) characterized in that the second logical channel (DPCH) and the first logical channel (CPICH) corresponding propagation channel cross-correlation and the first logical channel (CPICH) corresponding propagation channel autocorrelation maximum likelihood estimates (($\hat{\phi}_{dc}$(l)) and ($\hat{\phi}_{cc}$(l)) at different correlation lags (l=1, 2, . . . , L) are linearly combined ($\Sigma_{l=1}^{L}\alpha_l\hat{\phi}_{dc}$(l) and ($\Sigma_{l=1}^{L}\alpha_l\hat{\phi}_{cc}$(l)).

12. The method of claim 9, wherein the second logical channel (DPCH) and first logical channel (CPICH) cross-correlation and the first logical channel (CPICH) autocorrelation successive estimates (($\hat{\phi}_{dc}$(l)) and ($\hat{\phi}_{cc}$(l)) are taken at a fixed lag (l) and are low-pass filtered for the computation of the estimate of said complex factor ($\beta$).

13. The method of claim 9, wherein the estimate of said complex factor ($\beta$) is built as a linear combination of the beamforming complex factor estimates computed as the ratio of the second logical channel (DPCH) and the first logical channel (CPICH) corresponding propagation channels cross-correlation and the first logical channel (CPICH) corresponding propagation channel autocorrelation estimates at a certain lag (l)($\hat{\beta}_{ML}$(l)=$\hat{\phi}_{dc}$(l)/($\hat{\phi}_{cc}$(l)), $$\left(\hat{\beta} = \sum_{l=1}^{K}\gamma_l\hat{\beta}_{ML}(l)\right)$$

at lag l=1, 2, . . . , K.

14. The method as claimed in claim 11, wherein the estimate of said complex factor ($\beta$) is limited to the lag equal to 1.

15. An apparatus for estimating a propagation channel in a presence of transmit beamforming by accounting for a structure of two logical channels referred to as a common channel and a dedicated physical channel (CPICH, DPCH), and based on a common structure of corresponding propagation channels, said dedicated physical channel (DPCH) comprising two sub-channels (DPDCH, DPCCH), comprising:

a receiver providing channel estimation in a multipath environment to acquire a beamforming complex factor by modelling said propagation channels as a linear superposition of a finite number (p=1, . . . , P) of discrete multipath components following an uncorrelated scattering wide-sense stationary model, and wherein a multipath component is characterized by a time-varying multipath complex coefficient ($c_p$(t) and, $\beta_p c_p$, (t)) and a delay ($\tau_p$);

means for building a second logical channel comprising a (DPCH) channel and a first logical channel comprising a (CPICH) channel for corresponding propagation channel instantaneous maximum likelihood ML channel multipath coefficient estimates ($\hat{c}_{dpch}$(n)) and ($\hat{c}_{cpich}$(n));

means for performing interpolation of the above obtained (ML) instantaneous second (DPCH) and first (CPICH) logical channel corresponding propagation channel multipath coefficient estimates ($\hat{c}_{dpch}$(n)) and ($\hat{c}_{cpich}$(n)) to a lowest symbol rate of said second (DPCH) and first (CPICH) logical channels;

means for building an optimal linear prediction filter according to a joint second and first (DPCH-CPICH) channel maximum-a-posteriori criterion;

means for building a first sub-channel (DPDCH) multipath coefficient estimate ($\tilde{c}_{dpch\text{-}MAP}$(k)) by filtering with said optimal linear prediction filter with said interpolated ML instantaneous second (DPCH) and first (CPICH) logical channel corresponding propagation channel multipath coefficient estimates ($\hat{c}_{dpch}$(n)) and ($\hat{c}_{cpich}$(n)); and means for interpolating said first sub-channel (DPDCH) multipath coefficient estimate ($\tilde{c}_{dpch\text{-}MAP}$(k)) to the second logical channel (DPCH) symbol rate when said symbol rate is lower than the first logical channel (CPICH) symbol rate.

16. An apparatus for estimating first and second propagation channels being modeled as a linear superposition of a finite number of discrete multipath components following an uncorrelated-scattering wide-sense stationery model, each multipath component being described as time varying complex coefficients and one delay, comprising:
   a receiver,
   wherein said first propagation channel is associated with a common pilot channel (CPICH), said common pilot channel is transmitted without any beamforming,
   wherein the receiver is configured to estimate said first propagation channel based on pilots used for computing time varying multipath complex coefficient $c_p(t)$ and delay $\tau_p$ representative of said common pilot channel (CPICH),
   wherein said second propagation channel is associated with dedicated physical channels (DPCH) and is subject to transmit beaming,
   wherein said time vary multipath complex coefficient $c_p(t)$ and said delay $\tau_p$ of said first propagation channel estimate are used for estimating a second propagation channel, and
   wherein said receiver is further configured to estimate said second propagation channel and the estimation is derived from the computation of at least parameters comprising $\beta_p c_p(t)$, the delay $\tau_p$ and where $\beta_p$ is complex.

17. An apparatus for estimating a propagation channel in a presence of transmit beamforming by accounting for a structure of two logical channels referred to as a common channel and a dedicated physical channel (CPICH, DPCH), and based on a common structure of corresponding propagation channels, said dedicated physical channel (DPCH) comprising two sub-channels (DPDCH, DPCCH), comprising:
   a receiver providing channel estimation in a multipath environment to acquire a beamforming complex factor by modeling said propagation channels as a linear superposition of a finite number (p=1, . . . , P) of discrete multipath components following an uncorrelated-scattering wide-sense stationary model, and wherein a multipath component is characterized by a time-varying multipath complex coefficient ($c_p(t)$ and, $\beta_p c_p$, (t)) and a delay ($\tau_p$);
   means for building a second logical channel comprising a (DPCH) channel and a first logical channel comprising a (CPICH) logical channel for corresponding propagation channel instantaneous maximum likelihood ML channel multipath coefficient estimates ($\hat{c}_{dpch}(n)$) and ($\hat{c}_{cpich}(n)$);
   means for performing interpolation of the above obtained ML instantaneous second (DPCH) and first (CPICH) logical channel corresponding propagation channel multipath coefficient estimates ($\hat{c}_{dpch}(n)$) and ($\hat{c}_{cpich}(n)$) to a lowest symbol rate of said second (DPCH) and first (CPICH) logical channels;
   means for building an optimal maximum a posteriori estimate ($\tilde{c}_{cpich-MAP}(k)$) of the first logical channel (CPICH) multipath coefficient ($c_{cpich}(k)$);
   means for building an estimate ($\hat{\phi}_{dc}(l)$) of a cross-correlation ($E\{\hat{c}^t{}_{dpch}(n)$ and ($\hat{c}^*{}_{cpich}(n-l)\}$) between the first (CPICH) and second (DPCH) logical channel corresponding propagation channel multipath coefficient instantaneous maximum likelihood estimates ($\hat{c}_{dpch}(n)$) and ($\hat{c}_{cpich}(n)$) and an estimate ($\hat{\phi}_{dc}(l)$) of an autocorrelation ($E\{\hat{c}_{dpch}(n)$ and ($\hat{c}_{cpich}(n-l)\}$) between the first logical channel (CPICH) corresponding propagation channel multipath coefficient instantaneous maximum likelihood estimates ($\hat{c}_{dpich}(n)$) at non-zero correlation lag (l≠0) for noise suppression;
   means for estimating a beamforming complex factor ($\beta$) from said cross-correlation and the auto correlation estimates (($\hat{\phi}_{dc}(l)$) and ($\hat{\phi}_{cc}(l)$),
   means for building a first sub-channel (DPDCH) multipath coefficient estimate ($\tilde{c}_{cpich}(k)$) as a product of the optimal maximum a posteriori estimate ($\tilde{c}_{cpich-MAP}(k)$) of the first channel (CPICH) multipath coefficient and the cross-correlation and the auto correlation estimates (($\hat{\phi}_{dc}(l)$) and ($\hat{\phi}_{cc}(l)$); and
   means for interpolating said first sub-channel (DPDCH) multipath coefficient estimate ($\tilde{c}_{cpich-MAP}(k)$) to the second logical channel (DPCH) symbol rate when said symbol rate is lower than the first logical channel (CPICH) symbol rate.

* * * * *

UNITED STATES PATENT AND TRADEMARK OFFICE
CERTIFICATE OF CORRECTION

PATENT NO. : 8,005,159 B2
APPLICATION NO. : 10/532912
DATED : August 23, 2011
INVENTOR(S) : Giuseppe Montalbano It is certified that error appears in the above-identified patent and that said Letters Patent is hereby corrected as shown below:

In the Claims:

Column 27, line 22, "($\hat{c}_{pich}$ (n)" should be -- ( $\hat{c}_{pich}$ (n) ) --

Column 27, line 48, "sad" should be -- said --

Column 28, line 2-3, " ( $\sum_{l=1}^{L} a_l \hat{\phi}_{dc}(l)$ and $\sum_{l=1}^{L} a_l \hat{\phi}_{cc}(l)$ ) ,, should be -- ( $\sum_{l=1}^{L} a_l \hat{\phi}_{dc}(l)$ and $\sum_{l=1}^{L} a_l \hat{\phi}_{cc}(l)$ ) --

Signed and Sealed this
Seventeenth Day of March, 2015

Michelle K. Lee
*Director of the United States Patent and Trademark Office*